United States Patent
Lee et al.

(10) Patent No.: US 11,939,262 B2
(45) Date of Patent: Mar. 26, 2024

(54) METHOD FOR MANUFACTURING COAL-BASED GEOPOLYMER FOAM INCLUDING SILICA FUME

(71) Applicant: HEUNGKUK IND.CO., LTD., Hanam-si (KR)

(72) Inventors: Keeyun Lee, Seoul (KR); Hyo Kim, Namyangju-si (KR); Jihoi Heo, Seoul (KR)

(73) Assignee: HEUNGKUK IND.CO., LTD., Hanam-si (KR)

( * ) Notice: Subject to any disclaimer, the term of this patent is extended or adjusted under 35 U.S.C. 154(b) by 0 days.

(21) Appl. No.: 17/548,429

(22) PCT Filed: Mar. 25, 2021

(86) PCT No.: PCT/KR2021/003741
§ 371 (c)(1),
(2) Date: Jun. 23, 2022

(87) PCT Pub. No.: WO2022/181871
PCT Pub. Date: Sep. 1, 2022

(65) Prior Publication Data
US 2023/0202923 A1 Jun. 29, 2023

(30) Foreign Application Priority Data
Feb. 24, 2021 (KR) .......................... 10-2021-0025041

(51) Int. Cl.
| | | |
|---|---|---|
| C04B 18/08 | (2006.01) | |
| C04B 7/24 | (2006.01) | |
| C04B 7/28 | (2006.01) | |
| C04B 12/00 | (2006.01) | |
| C04B 18/14 | (2006.01) | |
| C04B 20/02 | (2006.01) | |
| C04B 22/06 | (2006.01) | |
| C04B 28/00 | (2006.01) | |
| C04B 38/10 | (2006.01) | |
| C04B 41/00 | (2006.01) | |
| C04B 28/26 | (2006.01) | |
| C04B 38/02 | (2006.01) | |
| C04B 103/10 | (2006.01) | |
| C04B 111/40 | (2006.01) | |

(52) U.S. Cl.
CPC ............ *C04B 12/005* (2013.01); *C04B 7/243* (2013.01); *C04B 7/28* (2013.01); *C04B 18/08* (2013.01); *C04B 18/141* (2013.01); *C04B 18/146* (2013.01); *C04B 20/026* (2013.01); *C04B 22/064* (2013.01); *C04B 28/006* (2013.01); *C04B 38/10* (2013.01); *C04B 41/0072* (2013.01); *C04B 28/26* (2013.01); *C04B 38/02* (2013.01); *C04B 2103/10* (2013.01); *C04B 2111/40* (2013.01); *Y02P 40/10* (2015.11); *Y02W 30/91* (2015.05)

(58) Field of Classification Search
CPC ......... C04B 12/005; C04B 7/243; C04B 7/28; C04B 18/08; C04B 18/141; C04B 18/146; C04B 20/026; C04B 22/064; C04B 28/006; C04B 38/10; C04B 41/0072; C04B 28/26; C04B 38/02; C04B 2103/10; C04B 2111/40; C04B 2201/20; C04B 2201/32; C04B 2201/50; C04B 12/00; C04B 18/14; C04B 18/04; C04B 18/149; C04B 20/02; C04B 22/06; C04B 28/00; C04B 41/00; C04B 18/06; C04B 40/0263; C04B 12/04; C04B 22/062; C04B 22/02; Y02P 40/10; Y02W 30/91
See application file for complete search history.

(56) References Cited

U.S. PATENT DOCUMENTS

2019/0315657 A1* 10/2019 Lee ...................... C04B 22/062

FOREIGN PATENT DOCUMENTS

| | | | |
|---|---|---|---|
| CN | 104098282 | A | 10/2014 |
| CN | 110372239 | A | 10/2019 |
| JP | 2017-132658 | A | 8/2017 |
| JP | 2017-202963 | A | 11/2017 |
| KR | 10-2007-0095767 | A | 10/2007 |
| KR | 10-1364149 | B1 | 2/2014 |
| KR | 10-1535275 | B1 | 7/2015 |
| KR | 10-1641536 | B1 | 7/2016 |
| KR | 101865877 | B1 * | 6/2018 |
| KR | 10-1901684 | B1 | 9/2018 |
| KR | 10-1988942 | B1 | 6/2019 |

OTHER PUBLICATIONS

G Masi, et al., A comparison between different foaming methods for the synthesis of light weight geopolymers, Ceramics Intl, 40(9) A, 2014, pp. 13891-13902. DOI:10.1016/j.ceramint.2014.05.108. (Year: 2014).*
Z. Abdollahnejad, et al. Mix design, properties and cost analysis of fly ash-based geopolymer foam, Construction and Building Materials, 2015, 80, 18-30. DOI: 10.1016/j.conbuildmat.2015.01.063. (Year: 2015).*
Liu, X.; Hu, C.; Chu, L. Microstructure, Compressive Strength and Sound Insulation Property of Fly Ash-Based Geopolymeric Foams with Silica Fume as Foaming Agent. Materials 2020, 13, 3215. https://doi.org/10.3390/ma13143215 (Year: 2020).*
KR-101865877-B1, machine translation (Year: 2018).*

(Continued)

*Primary Examiner* — Anthony J Green
*Assistant Examiner* — Marites A Guino-O Uzzle
(74) *Attorney, Agent, or Firm* — Studebaker & Brackett PC

(57) ABSTRACT

Disclosed herein are a lightweight geopolymer foam with low thermal conductivity and a manufacturing method therefor in which coal bottom ash and fly ash are used together as materials for the geopolymer foam and silica fume is added to a mixed solution of an alkali activator and sodium hydroxide. The geopolymer foam can be utilized for improving insulation performance and safety for a structure constructed with eco-friendly cement.

5 Claims, 35 Drawing Sheets

(56) References Cited

OTHER PUBLICATIONS

S. Shakouri et al. Development of silica fume-based geopolymer foams, Construction and Building Materials, 2020, 260, 120442. DOI:10.1016/j.conbuildmat.2020.120442. (Year: 2020).*
D. Hardjito et al. On the Development of Fly Ash-Based Geopolymer Concrete, Materials Journal 2004, 101, 6, 467-472. DOI: 10.14359/13485 (Year: 2004).*
A. Neville. The Better Environmental Option: Dry Ash Conversion Technology. Power Jul. 1, 2011 [retrieved on Aug. 3, 2023 from <URL: https://www.powermag.com/the-better-environmental-option-dry-ash-conversion-technology/>]. (Year: 2011).*
An Office Action mailed by China National Intellectual Property Administration dated Jun. 8, 2022, which corresponds to Chinese Patent Application No. 202180003803.0 and is related to U.S. Appl. No. 17/548,429; with English language translation.
Office Action issued in KR 10-2021-0025041; mailed by the Korean Intellectual Property Office dated Apr. 20, 2021.
"Decision to Grant" Office Action issued in KR 10-2021-0025041; mailed by the Korean Intellectual Property Office dated Jul. 13, 2021.
An Office Action; "Notice of Reasons for Refusal," mailed by the Japanese Patent Office dated May 9, 2023, which corresponds to Japanese Patent Application No. 2021-572370 and is related to U.S. Appl. No. 17/548,429; with English language translation.

* cited by examiner

METHOD FOR MANUFACTURING COAL-BASED GEOPOLYMER FOAM INCLUDING SILICA FUME

CROSS-REFERENCE TO RELATED APPLICATIONS

This application is the U.S. National Stage of International Application No. PCT/KR2021/003741 filed Mar. 25, 2021, which claims benefit of priority to Korean Patent Application No. 10-2021-0025041 filed Feb. 24, 2021, the entire content of which is incorporated herein by reference.

TECHNICAL FIELD

The present disclosure relates to a method for manufacturing a coal-based geopolymer foam including silica fume.

BACKGROUND ART

Cement is a generic term for an inorganic binder that reacts with other materials like water to set itself or coagulate them together. Generally, cement refers to ordinary Portland cement (OPC) because OPC accounts for 95% or more of the total cases of use. Portland cement is suitable for mass production due to its abundant raw materials and uncomplicated production method, but the production process suffers from the disadvantage of being very energy intensive and emitting a large amount of carbon dioxide. According to the Davidovits' report, as much as approximately one ton of carbon dioxide is emitted for the production of one ton of cement. Various efforts have been made in the cement industry to reduce carbon dioxide emissions by, for example, using biofuels, introducing new clinker types that consume less energy, and developing environmentally friendly concrete compositions, but due to the increase in cement demand in rapidly developing countries such as China and India, global carbon dioxide emissions increased from 5% in 2000 to 8% in 2014.

Geopolymers are attracting attention as an environmentally friendly alternative to OPC. A geopolymer is an inorganic polymer binder synthesized from the alkaline activation of reactive aluminosilicate materials rich in silica ($SiO_2$) and alumina ($Al_2O_3$) resulting in three-dimensional polymeric network. Geopolymer has advantages in terms of waste treatment because it can use industrial waste, such as coal materials generated from coal-fired power plants, mineral tailing from the mining industry, and red mud generated during aluminum refining processes, as raw materials.

Coal ash is divided into coal fly ash (CFA) and coal bottom ash (CBA). Being spherical in particle shape with a low particle size, fly ash exhibits high geopolymer reactivity. Thus, many studies have been conducted on the use of fly ash, and most of the amount produced is actually being used. In contrast, although being similar in composition to fly ash, bottom ash is difficult to use as a raw material for geopolymers because of its irregular, angular, and large particle size. There have not been many studies for the use of bottom ash, and most of the generated amount thereof is landfilled. In fact, according to the current status of coal ash generation by Korea South-East Power Co., among coal ash generated in 2018, fly ash was recycled in an amount of 79.07% and landfilled in an amount of 17.55% while 76.59% of bottom ash was landfilled. Coal ash landfill is causing various difficulties such as landfill cost and lack of landfill sites as well as soil and water pollution. Therefore, it is necessary to study the use of coal ash, especially bottom ash.

Meanwhile, the insulation performance of modern buildings is emerging as an important design standard. Currently, organic insulation materials, which are widely used for buildings, are vulnerable to high temperatures and causes human damage by emitting toxic gas in the event of a fire. Accordingly, an inorganic insulating material with excellent thermal insulation performance and strong resistance to high temperature is attracting attention. Currently utilized in the industry and academy fields is a method for synthesizing concrete and geopolymer foam, in which the reaction of chemical additives is used to generate gas. In the study of J. L. Bell and W. M. Kriven, a geopolymer in a foam structure was formed using hydrogen peroxide and aluminum powder. In addition, Aguilar et al. conducted research on the synthesis of geopolymer foam using various additives including silica fume. In such previous studies, metakaolin and fly ash were mainly used as materials, but the present disclosure is intended to utilize bottom ash as a material for manufacture of geopolymer foam by the form synthesis method.

The minimum use of aluminum powder is desired in terms of the environment because its production process is energy intensive. The surfactant is an organic material which may generate toxic materials upon high temperature decomposition. Silica fume is collected as a by-product of the silicon or silicon alloy production during which the reaction of silicon as an impurity is known to produce hydrogen gas. Through such reactions, a more stable geopolymer foam structure can be formed. Accordingly, only silicon fume is added as a foaming agent to synthesize geopolymer form, without the use of aluminum powder and a surfactant.

Korean Patent No. 10-1901684 discloses a method for preparing geopolymer with high compressive strength by using coal bottom ash. Korean Patent No. 10-2013-0057024 A pertains to a geopolymer binder using a waste disc and a fireproofing mortar composition using same, disclosing a fireproofing mortar composition comprising waste coal bottom ash as a raw material However, the coal-based geopolymer foam including silica fume as an environmentally friendly inorganic insulating material with improved insulation performance and safety for buildings according to the present disclosure has not yet been disclosed.

DISCLOSURE OF INVENTION

Technical Problem

Leading to the present disclosure, intensive and thorough research conducted in order to solve the problems encountered in the related art resulted in the finding that when coal bottom ash and fly ash were used together as geopolymer materials and silica fume was added to a mixed solution of an alkali activator and sodium hydroxide, the resulting geopolymer foam was characterized by low thermal conductivity and being lightweight.

Solution to Problem

In order to solve the problems, the present disclosure provides a method for manufacturing geopolymer foam with coal ash, the method comprising the steps of: (1) mixing water glass ($Na_2SiO_3$) and sodium hydroxide (NaOH) to prepare an alkali activator; (2) adding silica fume to the alkali activator and stirring the same; (3) pulverizing coal bottom ash; (4) mixing the coal bottom ash with coal fly ash to prepare coal ash; (5) adding the mixture of silica fume and the alkali activator to the coal ash and then further adding the alkali activator to adjust a ratio of alkali activator/solid material, followed by mixing the same; (6) loading and sealing the mixture in a mold to prepare a specimen; and (7) curing the specimen in an oven.

In an embodiment of the present disclosure, the alkali activator contains the water glass ($Na_2SiO_3$) and sodium hydroxide (NaOH) at a mass ratio of 5:1 and silica fume in an amount of 15% by weight.

In another embodiment of the present disclosure, the step of pulverizing coal bottom ash is carried out by crushing once with a jaw crusher and then milling four times with a hammer mill, without a sieving process, and the coal fly ash is contained in an amount of 10 to 50% by weight based on the total weight of the coal bottom ash and the coal fly ash.

In another embodiment of the present disclosure, the ratio of alkali activator/solid material may range from 0.38 to 0.50.

In another embodiment of the present disclosure, the method may further comprise a step of exposing to a temperature of as high as 200° C. to 600° C. for 2 hours the specimen that has completely undergone the curing.

Also, the present disclosure provides a geopolymer foam utilizing coal ash, manufactured by the manufacturing method.

Advantageous Effects of Invention

The present disclosure is concerned with a geopolymer foam prepared from a material including both coal bottom ash and fly ash in combination with a mixed solution of an alkali activator and sodium hydroxide added with silica fume, wherein the geopolymer exhibits low thermal conductivity and is lightweight, thus finding applications in improving insulation performance and safety for a structure constructed with eco-friendly cement.

BEST MODE FOR CARRYING OUT THE INVENTION

Figure 1:
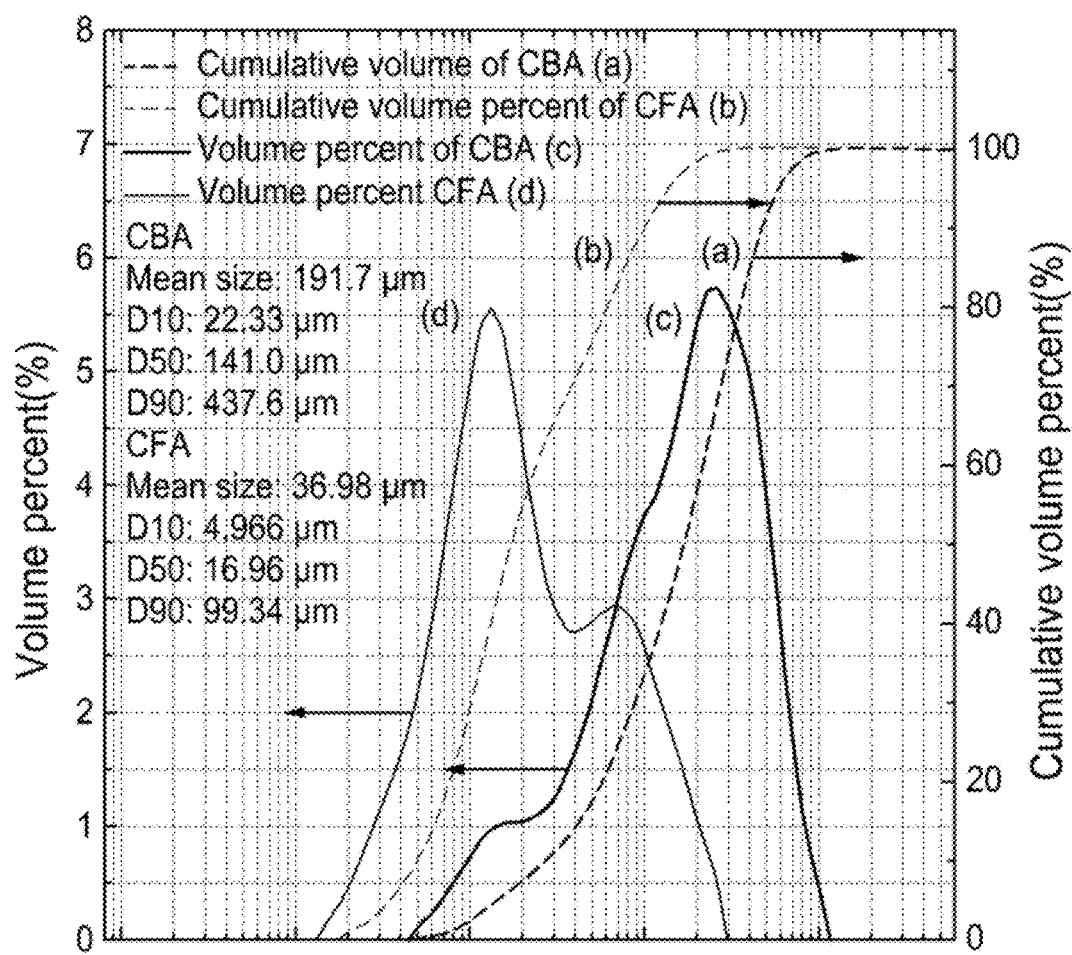
FIG. 1 shows particle size distributions of coal bottom ash (CBA, red) and coal fly ash (CFA, black) according to the present disclosure.

Hereinafter, particular embodiments of the present disclosure will be described in detail. In the following description, specific details such as detailed configuration and components are merely provided to assist the overall understanding of exemplary embodiments of the present disclosure. Therefore, it should be apparent to those skilled in the art that various changes and modifications of the embodiments described herein can be made without departing from the scope and spirit of the present disclosure. When a detailed description of a related known function or configuration is determined to make the subject matter of the present disclosure unnecessarily obscure, the detailed description thereof will be omitted.

An aspect of the present disclosure provides a method for manufacturing geopolymer foam with coal ash, the method comprising the steps of: (1) mixing water glass ($Na_2SiO_3$) and sodium hydroxide (NaOH) to prepare an alkali activator; (2) adding silica fume to the alkali activator and stirring the same; (3) pulverizing coal bottom ash; (4) mixing the coal bottom ash with coal fly ash to prepare coal ash; (5) adding the mixture of silica fume and the alkali activator to the coal ash and then further adding the alkali activator to adjust a ratio of alkali activator/solid material, followed by mixing the same; (6) loading and sealing the mixture in a mold to prepare a specimen; and (7) curing the specimen in an oven.

The present disclosure is characterized by the synthesis of a geopolymer foam in which use is made of both coal bottom ash and fly ash as materials for the geopolymer and a mixed solution of water glass ($Na_2SiO_3$ solution) and sodium hydroxide (NaOH) as an alkali activator and silica fume is added thereto.

Korean Patent No. 10-1901684 discloses a method for preparing geopolymer with high compressive strength by using coal bottom ash. In contrast to the present disclosure of Korean Patent No. 10-1901684 wherein the alkali activator is quantitatively adjusted so that a mixture of coal bottom ash and an alkali activator does not become a gel, the present disclosure employs an alkali activator basically in a sufficient amount to make the mixture flowable. Thus, the present disclosure is characterized in that the mixture is simply poured to a mold without filling and compressing processes and cured in an oven as it remains in the mold. The amount of the alkali activator is adjusted so that the geopolymer paste is rendered flowable. The ratio of alkali activator/solid material (L/S ratio) is controlled to fall within 0.38-0.50. A geopolymer foam can be formed beyond the range, and the L/S ratio ranges can be changed according to particle sizes of the coal ash and silica fume used, and the concentration of the alkali activator, etc., but with no limitations thereto.

In the present disclosure, the mixture must be in a flowable state in order to expand sufficiently. When the alkali activator is used in a lesser amount, the density increases, resulting in the formation of a geopolymer foam which is high in terms of thermal conductivity and compressive strength. In the present disclosure aiming to synthesize a lightweight geopolymer foam low in thermal conductivity, experiments were conducted with the amount of alkali activator increasing. The flowing mixture has the advantage of being easy to cast according to the shape and size of the mold.

In addition, in Korean Patent No. 10-1901684, the compressive strength and thermal conductivity of the geopolymer was controlled by adjusting the pressure applied to compression molding. However, the present disclosure is to provide a geopolymer foam whose properties including compressive strength, bulk density, and thermal conductivity can be controlled by adjusting quantities and exposure temperatures of coal fly ash and alkali activator.

Particularly, the step of pulverizing coal bottom ash is carried out by crushing once with a jaw crusher and milling four times with a hammer mill, without a sieving process.

Korean Patent No. 10-1901684 has an object of improving the compressive strength of a geopolymer while the present disclosure aims to improve thermal insulation. In this regard, Korean Patent No. 10-1901684 discloses that a geopolymer having a dense structure is manufactured by compressive molding, followed by oven curing and microwaving, and exhibits high compressive strength, thermal conductivity, and bulk density. However, the present disclosure targets the manufacture of a geopolymer foam low in bulk density, thermal conductivity, and compressive strength by pouring the mixture into a mold and inciting expansion through oven curing to give lightweight geopolymer foam.

In addition, the thermal conductivity and bulk density is greatly lowered by heating in an electric furnace, without additionally microwaving, after the oven curing. In this process, hardened water glass remaining in the foam structure expands, together with the removal of residual moisture, to form a secondary foam. Thus, the addition of water glass is an indispensable for the mixing step in order to form a stable foam in the oven curing step as well as the secondary foam.

In the alkali activator, water glass ($Na_2SiO_3$) and sodium hydroxide (NaOH) are mixed preferably at a mass ratio of 5:1, but with no limitations thereto.

Silica fume, which is an industrial byproduct, requires high cost for transport and storage thereof because it is in a particle form with a particle size of as extremely small as nanometers and a low volume and flies upon generation. In order to solve this problem, silica fume particles are generally aggregated into a densified form for use. The present disclosure also employs high-density silica fume and thus includes as an indispensable process the step of mixing silica fume with the alkali activator, prior to with coal ash, to disperse the particles, thus forming a regular foam structure. It may be possible to reduce particle sizes by grinding or sieving silica fume, but this method has been found to have a disadvantage in that the manufactured geopolymer foams do not maintain morphological consistency according to grinding and sieving efficiency, and thus a method of mixing with an alkali activator is adopted. The silica fume used may be preferably contained in an amount of 15% by weight, but with no limitations thereto.

In the present disclosure, it has been observed that geopolymer foam can be formed even when only coal bottom ash is used as a raw material, but a somewhat unstable foam is formed. Thus, coal fly ash is preferably contained as an essential constituent, which amounts to 10 to 50% by weight based on the total weight of the coal bottom ash and coal fly ash, but with no limitations thereto.

Optionally, the present disclosure may further comprise a step of exposing to a high temperature the specimen which has been completely cured in order to manufacture an inorganic insulation material having excellent insulation performance and strong resistance to high temperatures, thereby avoiding a reduction in strength due to cracks or the like generated when a simple drying method is used. The method may further comprise a step of exposing the specimen preferably to a temperature of 200° C. and more preferably to a temperature of 200° C. to 600° C. for 2 hours, so as for the geopolymer to have resistance to water, but with no limitations thereto.

Also, contemplated according to another aspect of the present disclosure is a geopolymer foam employing coal ash, manufactured by the manufacturing method.

The advantages and features of the present disclosure and methods of achieving them will be apparent from the following exemplary embodiments. It should be noted, however, that the present disclosure is not limited to the following exemplary embodiments, and may be implemented in various forms. Accordingly, the exemplary embodiments are provided only to disclose the present disclosure and let those skilled in the art know the category of the present disclosure.

<Example 1> Raw Materials and Experiment Methods

Figure 2:
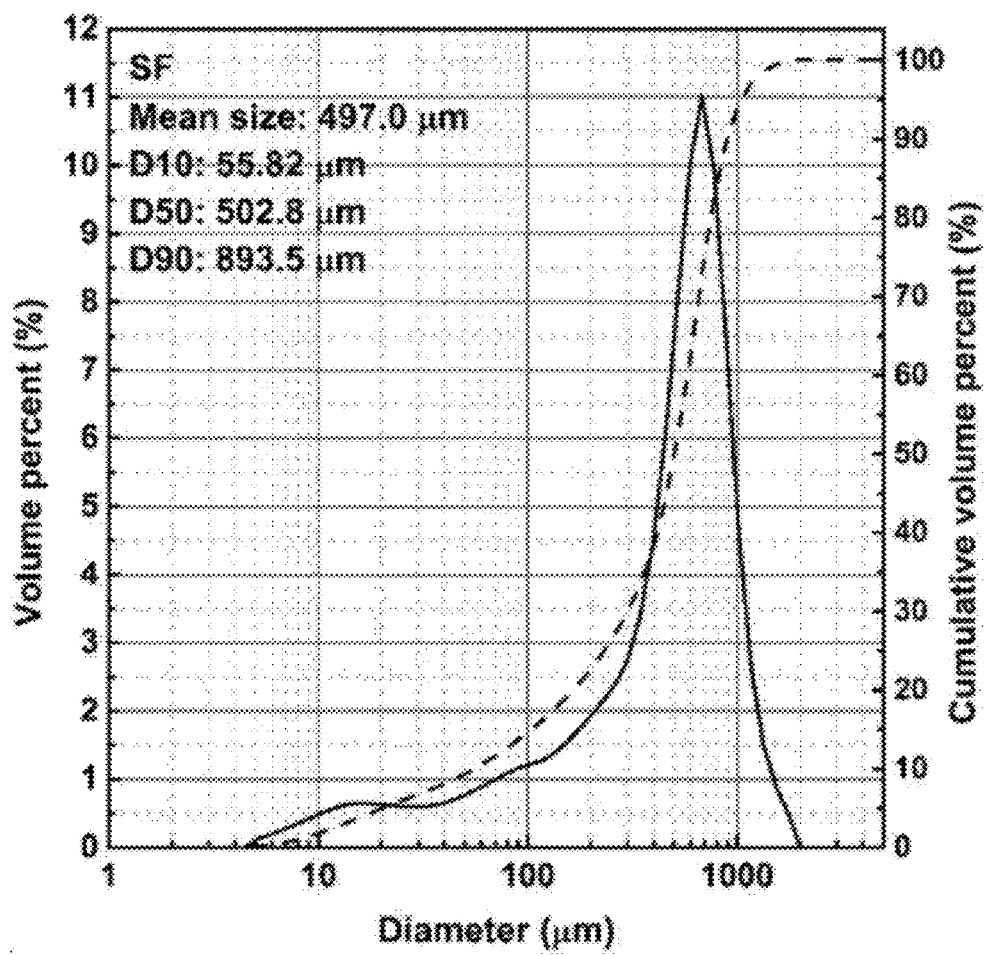
FIG. 2 shows a particle size distribution of silica fume (SF) according to the present disclosure.

Coal bottom ash was provided from Youngheung Power Plant, coal fly ash from Seochun Power Plant, and silica fume (undensified microsilica) from Silkroad C&T Co. Ltd. Particle sizes of coal bottom ash were reduced by crushing once with a jaw crusher and milling four times with a hammer mill. Particle size distributions of coal bottom ash, fly ash, and silica fume were measured using a laser scattering method (LA-960, Horiba, Japan), and the results are depicted in FIGS. 1 and 2. The particles were densified as the bottom ash has a mean particle size of 191.7 μm, with 90% thereof being 99.34 μm or less in size and the silica fume had a mean size of 497.0 μm, with 90% thereof being 893.5 μm or less in size.

The chemical composition was determined by X-ray fluorescence analysis (ZSK Primus II, Rigaku, Japan) and loss on ignition (LOI) was measured following the procedure described in ASTM D 7348. The percentages of components from X-ray fluorescence analysis were recalculated to total 100% including LOI. The result is summarized in Table 1, below.

broad hump of spectra was observed over the range of $2\theta=15\text{-}40°$, accounting for the presence of an amorphous phase. Crystallinity was measured to amount to 37.19% in the bottom ash, 69.18% in the fly ash, and 6.83% in the silica fume. A relatively great deal of crystalline phase existed in the fly ash while the silica fume was accounted for mostly by amorphous phase. In the XRD patterns, peaks of quartz, mullite, anorthite, and magnetite were detected for the bottom ash, peaks of quartz, mullite, and hematite for the fly ash, and peaks of quartz, kalsilite, and liebermannite for the silica fume.

As an alkali activator for synthesizing a geopolymer foam, a mixture of water glass (sodium silicate solution, $Na_2O$ 9-10%, $SiO_2$ 28-30%, Daejung chemicals and metals, South Korea) and NaOH (sodium hydroxide beads, 98% purity, Samchun, South Korea) was used. After mixing, the solution was cooled to room temperature until use by releasing the heat generated from the exothermic dissolution process. In a preliminary experiment, a water glass/NaOH mass ratio was determined to be 5 for the alkali activator for the following reason. Experimentally, when the water glass/NaOH mass ratio was less than 5, the mixed solution gradually turned cloudy and hardened. In contrast, at a water glass/NaOH mass ratio of greater than 5, the geopolymer paste was unlikely to expand as free silicon in the silica fume did not sufficiently react. Silicon reacts with water in an alkaline environment to generate hydrogen gas, as illustrated in the reaction formula, below. Thus, an insufficient amount of NaOH does not guarantee an alkaline condition necessary for the silicon reaction.

$$Si°+4H_2O \rightarrow Si(OH)_4+2H_2(g)$$

Accordingly, the water glass/NaOH ratio at which a maximum reaction of silica fume can be induced without hardening the mixed solution of water glass and NaOH was determined to be 5.

As can be seen in FIG. 2, the silica fume is in a densified form with a large particle size. When used in the synthesis of geopolymer foam, the silica fume particles were not sufficiently dispersed so that a somewhat irregular foam structure is formed. The densified particles can be effectively dispersed by ultra-sonication and their sizes can be reduced by physical pulverization. However, these methods may be inefficient because they require separate devices and processing processes. In the present disclosure, silica fume was added to the alkali activator and stirred at 300 rpm for 1

TABLE 1

| wt. % | $SiO_2$ | $Al_2O_3$ | $Fe_2O_3$ | CaO | $TiO_2$ | $K_2O$ | MgO | $Na_2O$ | Others | LOI |
|---|---|---|---|---|---|---|---|---|---|---|
| CBA | 52.0 | 19.1 | 13.1 | 6.81 | 1.16 | 1.47 | 1.84 | 2.16 | 2.24 | 0.200 |
| CFA | 48.4 | 22.2 | 6.00 | 4.03 | 1.43 | 1.72 | 1.11 | 1.21 | 10.7 | 3.24 |
| SF | 86.6 | 0.415 | 0.896 | 0.324 | 0.000 | 2.71 | 1.53 | 0.805 | 3.27 | 3.40 |

The coal fly ash (CFA) is classified as Class F coal fly ash according to ASTM C618 because the sum of $SiO_2$, $Al_2O_3$, and $Fe_2O_3$ is larger than 70%. The chemical composition of coal bottom ash (CBA) was analogous to that of fly ash and the silica fume was composed mostly of silica.

Figure 3:
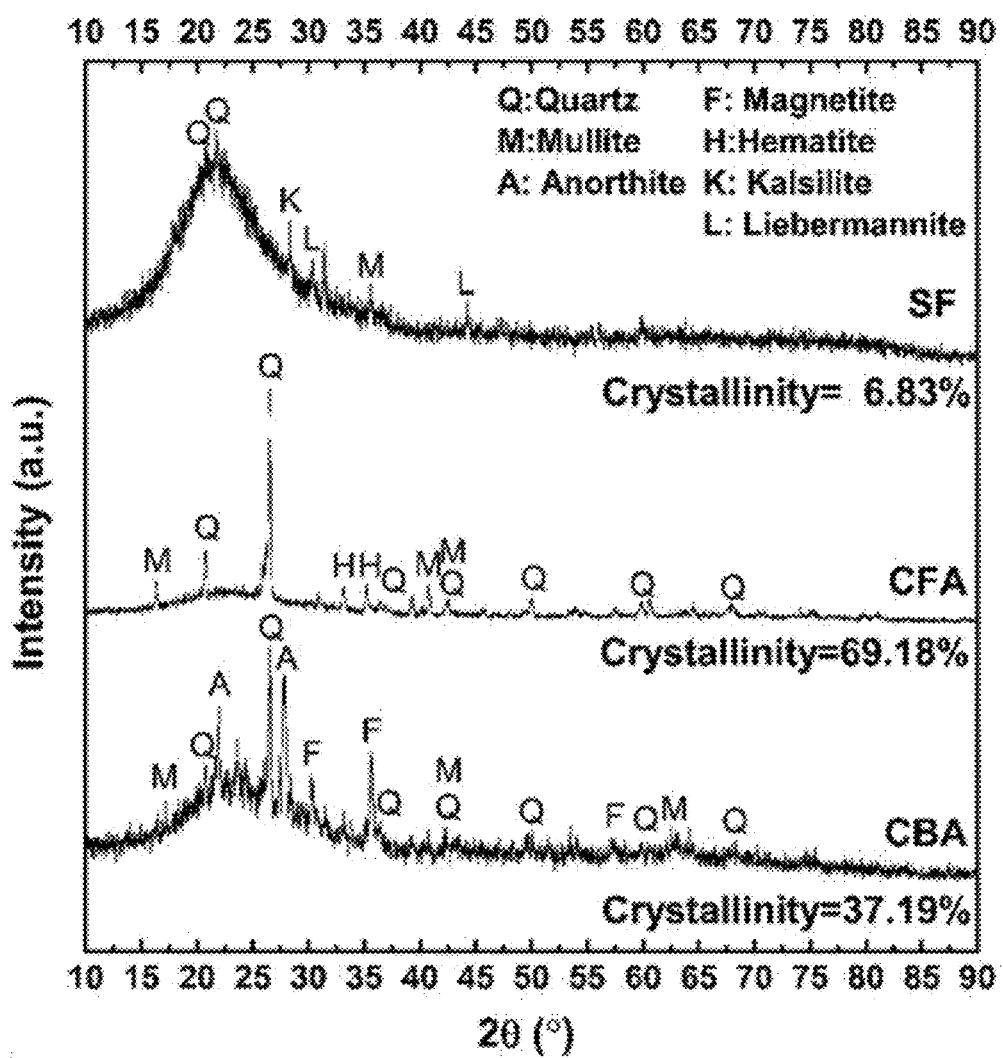
FIG. 3 shows XRD spectra of coal bottom ash (CBA), coal fly ash (CFA), and silica fume (SF) according to the present disclosure, together with their crystallinity.

Crystalline/amorphous structures were determined by qualitative and quantitative analyses of X-ray diffraction (XRD) (DMAX 2500, Rigaku, Japan) measured with Cu K alpha radiation at scan width 0.02° and scan speed 2°/min. The results are given as depicted in FIG. 3. Commonly, a hours by an overhead stirrer. The amount of silica fume added was determined to be 15 wt. % of the solid material in a preliminary experiment.

A foam could be formed with only the bottom ash in the present disclosure, but was somewhat unstable. To overcome such instability, fly ash was used together as a material. The content of fly ash in the sum of bottom ash and fly ash was set to be 10, 30, and 50% by mass, and samples of the geopolymer foam synthesized according to the proportions were named FA10, FA30, and FA50, respectively. The alkali activator/solid material ratio (L/S ratio) was controlled to range from 0.38 to 0.50, with intervals of 0.02. The samples were named according to the parameters as follows:

∘∘FA▢▢

∘∘=L/S ratio×100.

▢▢=CFA/(CBA+CFA)×100.

For example, when prepared at L/S ratio=0.42 and CFA/(CBA+CFA)=0.30, the sample was named 42FA30. The mixing ratio of the raw materials and the corresponding sample group names are summarized in Table 2 below.

TABLE 2

| Sample group | Solid materials (wt. % in solid) | | | Liquid/Solid ratio (L/S ratio) | Note |
|---|---|---|---|---|---|
| | CBA | CFA | SF | | |
| FA10 | 76.50 | 8.500 | 15.00 | 0.38-0.50 with an interval of 0.02 | CFA/(CBA + CFA) = 0.10 |
| FA30 | 59.50 | 25.50 | 15.00 | | CFA/(CBA + CFA) = 0.30 |
| FA50 | 42.50 | 42.50 | 15.00 | | CFA/(CBA + CFA) = 0.50 |

The synthesis of geopolymer foam was carried out according to the following processes. In preliminary experiments, a water glass solution and NaOH were mixed at a mass ratio of 5:1 to prepare an alkali activator. After being cooled to room temperature, the alkali activator was added with silica fume and mixed at 300 rpm for one hour using an overhead stirrer. For a homogenous mixture, bottom ash and fly ash were first mixed in their dry states and added with the mixture of the alkali activator and silica fume and then additionally with the alkali activator to control the L/S ratio. The mixture was blended at 60 rpm for 5 minutes in a Hobart mixer and then poured into a 50×50×50 mm³ plastic cubic mold, wrapped in a plastic bag, and cured at 75° C. for 72 hours in an oven. In this regard, a Teflon tape was attached to the mole to prevent the sample from adhering thereto. After curing, the precast sample was demolded and expanded portions were trimmed with a diamond saw to prepare a 5-cm cubic sample. Physical properties were analyzed as follows.

The samples sufficiently cooled to room temperature were measured for mass and calculated for bulk density, followed by measurement of thermal conductivity (TPS500S, Hot Disk®, Sweden). Compressive strength of each sample was measured using a compression testing machine (PL-9700H, Woojin Precision Co., South Korea) according to ASTM C109. Some internal part of the specimens broken upon the compressive strength testing was selected and finely ground using a pestle and mortar and sifted with a No. 100 standard sieve (mesh 150 μm). The sample powder thus obtained was used in subsequent analyses. Powder density was measured using a gas pycnometer (AccuPyc II 1340, Micromeritics, USA) and H₂ gas, and porosity was calculated from the powder density measurements and the bulk densities of the samples according to the following formula.

$$\text{Porosity (\%)} = \left(1 - \frac{\text{Bulk density}}{\text{Powder density}}\right) \times 100$$

For the bulk density and the compressive strength, mean values obtained from triplicate measurements were used. Mean values of quintuplicate and sextuplicate measurements were made for the thermal conductivity and the powder density, respectively. In order to observe pore structures of the geopolymer foam, extra samples were sectioned in the vertical direction and photographed with a digital camera (EOS 750D, Canon, Japan). For foam structure and micro-morphological observation, scanning electron microscopy (SEM) (Nova Nano SEM 200, FEI, USA) was employed to take images of the sample. The internal parts of the specimens broken after compressive strength testing were rubbed with a 120-grit sandpaper. Some specimens were additionally subjected to SEM/EDS analysis (field emission scanning electron microscope, SU8010, HITACHI, Japan) to observe a change of constituent element ratios in the microscopic structure. When the geopolymer foams were exposed to high temperatures, changes in physical properties were analyzed using the following additional experiments. Mass loss behaviors upon exposure to high temperatures were observed by conducting TG analysis (SDT-Q600, TA Instruments, USA) on representative samples which had completely undergone oven curing. The samples were monitored for mass change while being heated from room temperature to 1,000° C. at a rate of 10° C./min in atmospheric condition. From the measurements, DTG curves were obtained. For a sample size change upon exposure to high temperatures, dilatometry (DILa 402C, NETZSCH, Germany) was performed on 46FA10, 46FA30, and 46FA50 samples. A part cut from a 5-cm cubic sample was measured for length changes while being heated from room temperature to 800° C. at a rate of 5° C./min in atmospheric condition.

Additionally, the specimens which had completely cured were heated in an electric furnace (S-1700, HANTECH, Korea) in order to monitor changes in pore structure and physical properties during exposure to high temperature. First, representative specimens were selected for use in examining effects of exposure temperatures. The specimens were heated to 200, 300, 400, 500, and 600° C. at a rate of 5° C./min, respectively and exposed for 2 hours to the target temperatures after reaching the temperatures. Then, the samples were spontaneously cooled to room temperature before measuring physical properties. Thereafter, specimens in FA30 group were exposed to a temperature of 200-500° C. in the same manner in order to examine L/S ratio effects. For effects of fly ash contents, specimens in FA10 and FA50 groups was exposed to a temperature of 400° C. The above-mentioned analyses except for TG and DIL were performed on the specimens exposed to such high temperatures. Additionally, the representative specimens exposed to a temperature of 200-600° C. were subjected to the following analyses. To examine the chemical structural changes of the geopolymer foams upon exposure to high temperatures, ATR-FTIR (attenuated total reflection Fourier transform infrared spectrometry, Frontier FT-IR Spectrometer, PerkinElmer, USA) was performed. The spectra were recorded within a range of 4000-380 cm$^{-1}$ in transmittance with a 4 cm$^{-1}$ resolution. For crystalline phase change observation upon exposure to high temperatures, XRD (X-ray diffraction, D/max-2500/PC, Rigaku, Japan) analysis was performed at a scan speed of 2°/min, and scans were recorded in the 2θ range of 10-90° using a step size of 0.02°.

Figure 4:
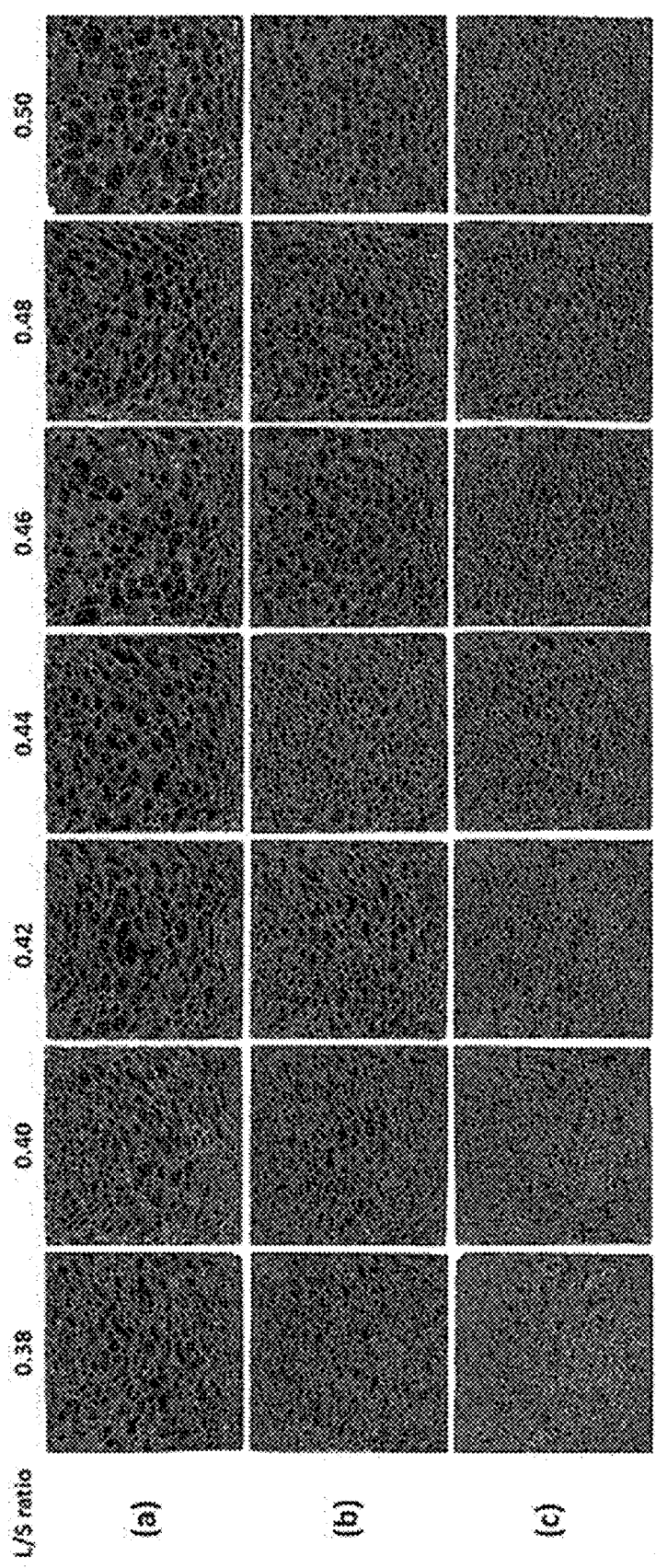
FIG. 4 shows vertically cross-sectional images of geopolymer foams with various L/S ratios according to the present disclosure. (a) FA10, (b) FA30, (c) FA50.

<Test Example 1> Physical Properties of Silica Fume-Added, Coal Ash-Based Geopolymer Foam 1. Macroscopic Structural Observation FIG. 4 shows images of cross sections of geopolymer foam samples. Samples in FIG. 4a were relatively irregular in morphology with large pore structures, and smaller pore sizes were detected in FIG. 4b and even smaller pore sizes in FIG. 4c. In addition, each sample group tended to increase in pore size with the increase of the L/S ratio. This change mechanism of pore structures can be elucidated as follows. In the present disclosure, the geopolymer paste was cured at 75° C. during which two mechanisms of (1) the paste curing due to geopolymerization and (2) the expansion attributed to silicon reactions competes with each other. Given a large amount, fly ash exhibits high reactivity leading to the predominance of geopolymerization. Thus, the curing proceeds quickly to form robust pore walls so that bubbles formed by hydrogen gas do not coalesce, but remains as small pore structures. However, if the geopolymerization is too fast, the curing occurs before generation of sufficient pore structures to inhibit expansion. Conversely, when a small amount of fly ash is added, large pore structures are formed as bubbles merge. Pore formation is also greatly affected by the L/S ratio. When the L/S ratio is low, relatively little moisture evaporates rapidly with the concomitant acceleration of the geopolymerization, resulting in faster curing. On the other hand, when the L/S ratio is high, curing not only occurs late, but also silicon sufficiently reacts to generate a large amount of hydrogen gas, and as a result, bubbles coalesce to form a large pore structure.

In all samples, a somewhat dense structure consisting of small pores is formed on the bottom and lateral surfaces compared to the center of the sample. This phenomenon is considered to result from the uneven transfer of heat across the volume of the geopolymer paste at the early stage of curing in the oven. In the early stage of curing, the top surface of the geopolymer paste contained in the mold is exposed to the atmosphere, with the lateral and bottom surfaces in contact with the mold. As the paste was cured in an oven at 75° C., it is considered that heat was quickly transferred to the area in contact with the mold and slowly to the center of the paste. At this time, the rapid temperature increase at the contact area seemed to accelerate the geopolymerization to make the curing dominant, resulting in the formation of a dense structure. In particular, many elliptical pore structures were observed in samples of the FA10 group, and since the group had a low fly ash content and thus exhibited a dominant bubble formation due to generation of hydrogen gas, and even though the pores were formed, pores were collapsed due to a slow curing rate or had elliptical shapes that seems to be pressed by the weight of the paste. It should be noted that due to the inhomogeneity of the pore structure, the physical property values presented later do not reflect all the physical properties of the entire sample.

2. Bulk Density and Porosity

Figure 5:
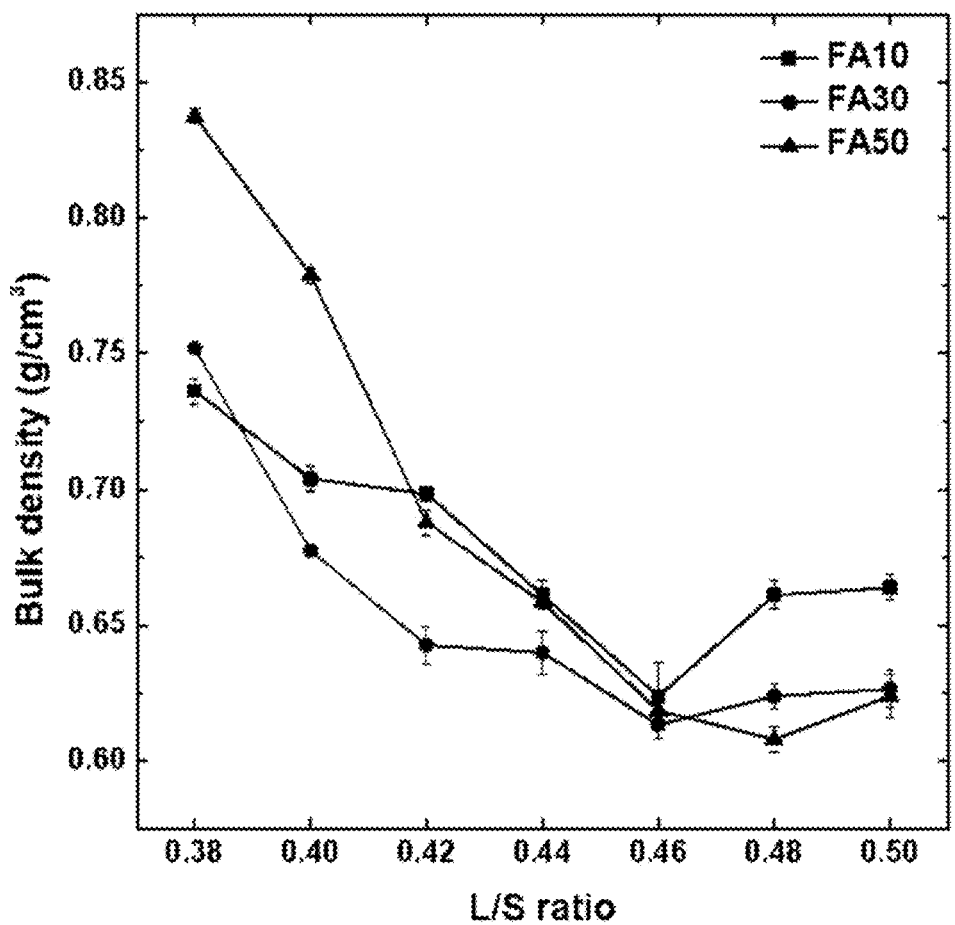
FIG. 5 shows bulk density of geopolymer foams against L/S ratio according to the present disclosure.
Figure 6:
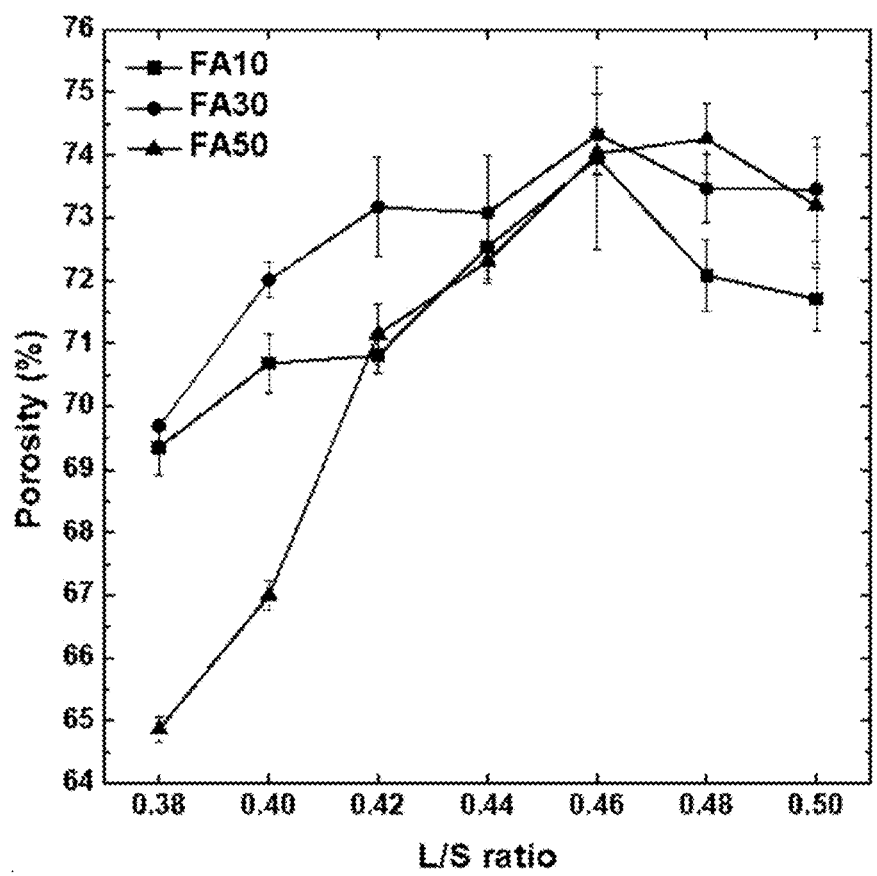
FIG. 6 shows porosity of geopolymer foams against L/S ratio according to the present disclosure.

FIGS. 5 and 6 show bulk densities and porosities against L/S ratios for each geopolymer foam sample group, respectively. The bulk density tends to decrease with the increase of the L/S ratio, and then increases again after the minimum point. Contrary to the tendency of the bulk density, the porosity tends to increase and then decrease with the L/S ratio. The decrease in bulk density with increasing of the L/S ratio is attributed to the high level of expansion resulting from the slow curing and sufficient bubble generation, as described above. However, the bulk density increases again at a certain L/S ratio or higher, which is thought to result from the moisture remaining inside the structure, and will be contemplated in the subsequent thermal conductivity results. In particular, the FA10 group sample increase in bulk density to a relatively large level at a L/S ratio of 0.46 or higher, which seems to result from the collapse of some pores due to unstable foam formation as well as residual moisture.

When bulk density is taken into consideration by geopolymer foam sample group, a low bulk density was entirely achieved in FA30 group as fly ash was further added, compared to FA10 group, but FA50 group exhibited a similar or higher bulk density rather. Particularly, samples in FA50 group had high bulk densities at a L/S ratio of 0.40 or less, which was attributed to the fact that there was relatively much fly ash with high reactivity and low L/S ratio so that the curing occurred quickly and hindered expansion. Conversely, geopolymer foam with high density was formed in the FA10 group as the formed foam structure was slowly cured and pores collapsed. Consequently, the data for such bulk density and porosity imply that the pore structure of geopolymer foam can be controlled by adjusting contents of fly ash and amounts of the alkali activator.

3. Thermal Conductivity

Figure 7:
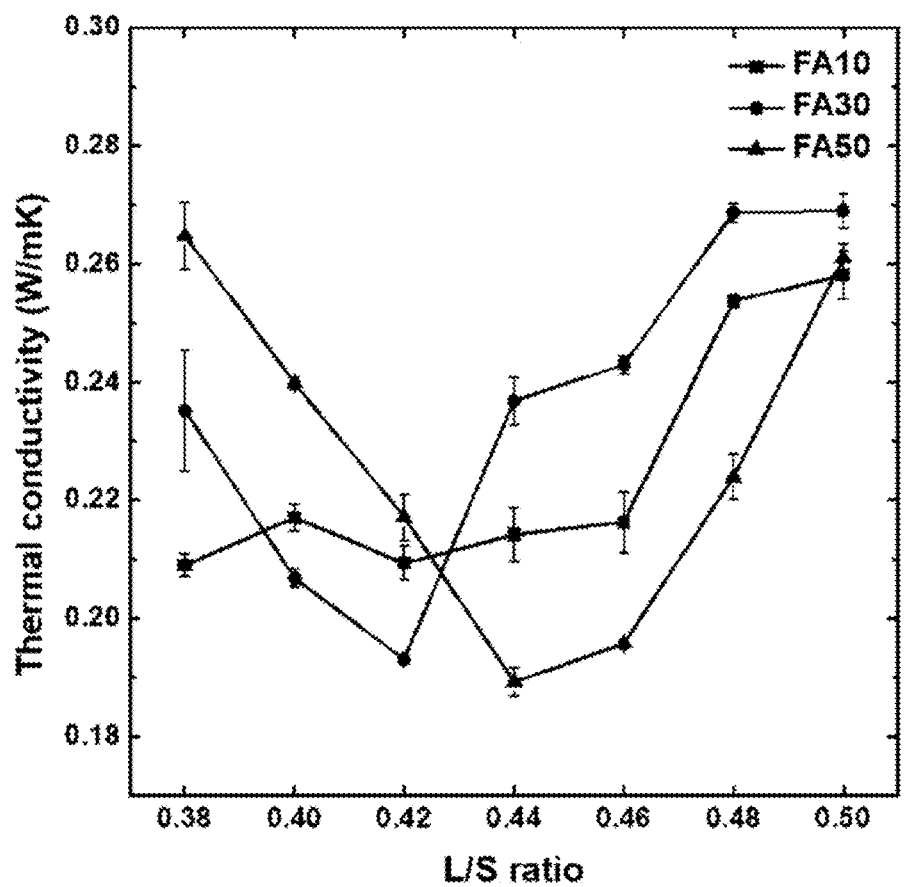
FIG. 7 shows thermal conductivity of geopolymer foams against L/S ratio according to the present disclosure.

The samples were vertically cut to measure the thermal conductivity of the central area, and the results are depicted in FIG. 7. Geopolymer with a low bulk density generally has low thermal conductivity, but a somewhat different tendency was observed in the present disclosure. As seen in FIG. 5, the bulk density tended to decrease down to an L/S ratio of 0.46 and then increase in FA10 and FA30 groups and down to an L/S ratio of 0.48 and then increase in FA50 group. However, FA10 group shows a similar level of thermal conductivity until the L/S ratio of 0.46 and then tends to increase significantly at an L/S ratio of greater than 0.46. In addition, FA30 and FA50 groups tend to decrease until the L/S ratios of 0.42 and 0.44, respectively, and then increase. This is related to characteristics of the water glass solution contained in the added alkyl activator. The water glass solution elutes silica and alumina from the raw material, and Si species present in the water glass participate in the early geopolymerization to form a geopolymer structure. Furthermore, the water glass does not participate in the geopolymerization, but hardens by itself to serve as a binder while forming various structures including a silanol group (Si—OH) and siloxane (Si—O—Si) bond. Particularly, the silanol group on the surface is produced as a result of the condensation and polymerization of silicate, with the OH group thereof playing a role in physically binding water molecules (physically bound water). In addition, silanol groups exists within the structure (internal silanol), functioning to bind water (structurally bound water). The moisture that exists physicochemically is a cause of high thermal conductivity. Moreover, since OH groups present on the surface are hydrated and permeate when in contact with water, the structure may weaken when exposed to wet environments or when in contact with water. Therefore, it is important to remove the moisture and OH groups from the surface in order to impart excellent thermal insulation performance and water resistance to the geopolymer foam of the present disclosure.

Despite the reduced bulk density due to foam formation, the FA10 group with low fly ash was abundant in the water glass that did not participate in the geopolymerization, due to low reactivity bottom ash particles, and thus maintained a constant level of thermal conductivity without a decrease. In the FA30 and FA50 groups, relatively much water glass would have participated in the geopolymerization as fly ash was added. Thus, their thermal conductivity decreased with the decreasing tendency of volume density. However, as the L/S ratio increases, the thermal conductivity seems to have increased due to the presence of residual moisture in the structures of the sample groups. Such residual moisture is not easily removed even if left at room temperature, and may be removed by drying or exposing to high temperatures. However, the drying method removes moisture required for the geopolymer structure to weaken the structure, and cracks occur with the evaporation of moisture, which can lead to decreasing the strength to a great extent.

4. Compressive Strength

Figure 8:
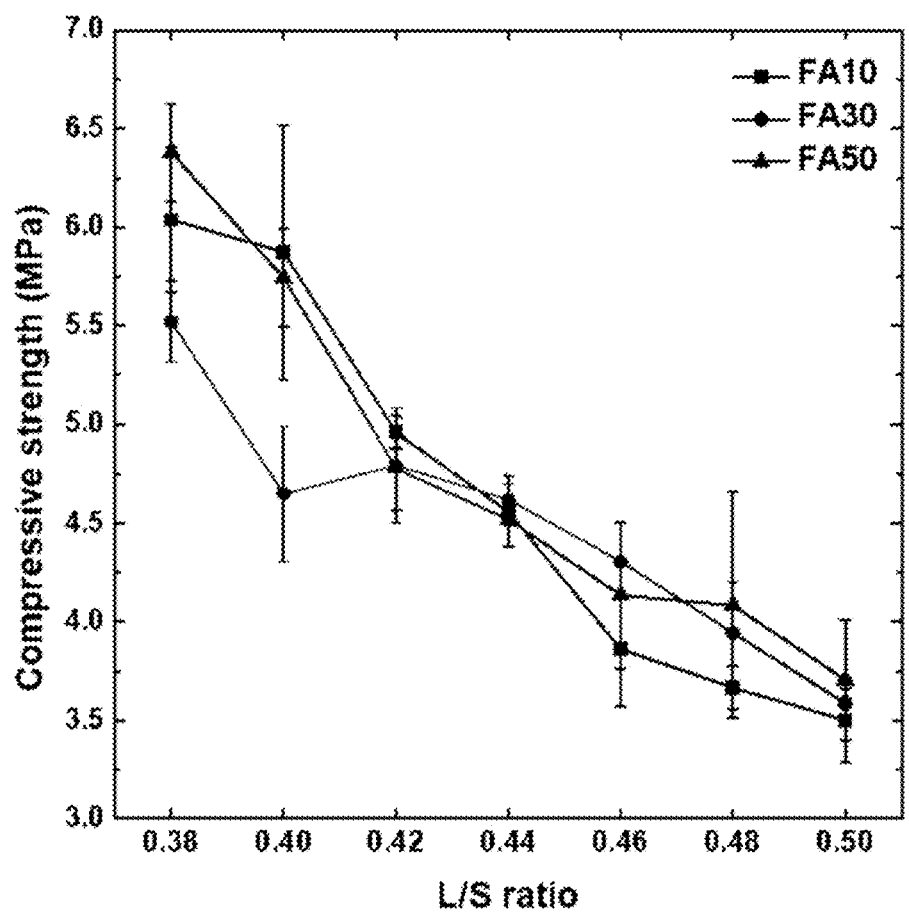
FIG. 8 shows compressive strength of geopolymer foams against L/S ratio according to the present disclosure.
Figure 9:
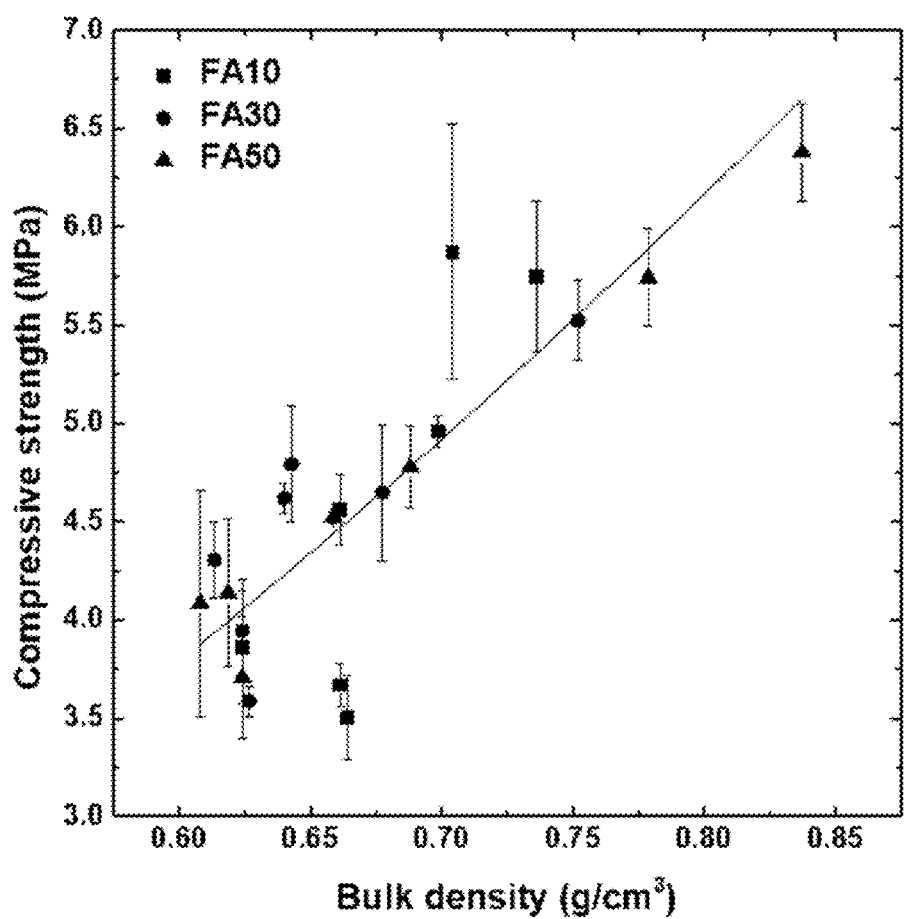
FIG. 9 shows compressive strength against bulk density according to the present disclosure.

FIG. 8 is a plot showing compressive strength of geopolymer foam samples. The compressive strength did not show a significant change according to the fly ash content, but tended to decrease as the L/S ratio increased. In FIG. 9, the bulk density is generally reduced, with the consequent decrease of the compressive strength. In addition, the increase in bulk density at high L/S ratios was attributed to the residual moisture. Hence, exclusion of such moisture may allow a sample having a higher L/S ratio to form a foam having a lower bulk density. In addition, since residual moisture can weaken the geopolymer structure, such factors are causative of low compressive strength. The compressive strength of a material with a pore structure, such as geopolymer foam, is greatly influenced by the physical characteristics, such as volume density and porosity. FIG. 9 depicts compressive strength against bulk density. On the whole, lower bulk densities bring about lower levels of compressive strength.

5. SEM/EDS

Figure 10:
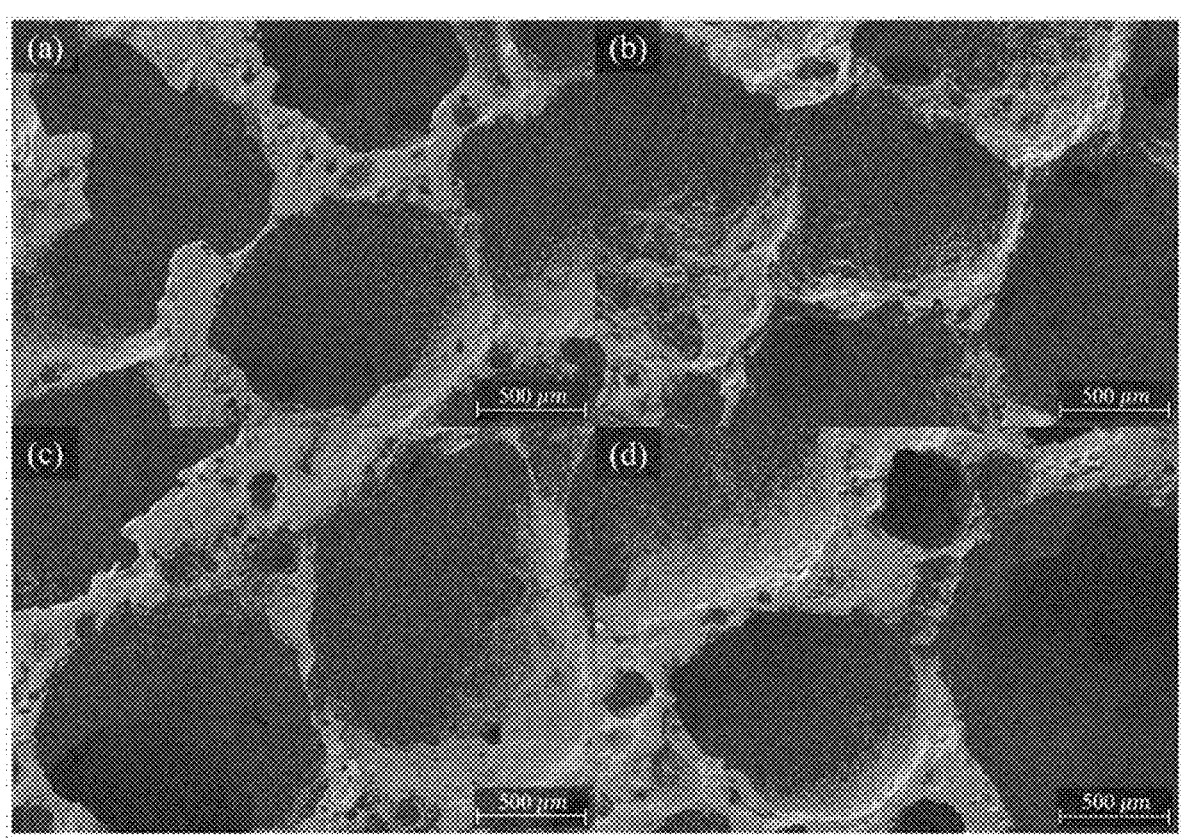
FIG. 10 shows SEM images of FA30 geopolymer foams with various L/S ratios according to the present disclosure (5.0 kV, ×50). (a) 0.38, (b) 0.42, (c) 0.46, (d) 0.50.

FIG. 10 shows SEM images of the samples in FA30 group according to L/S ratios. The sample with a low L/S ratio in FIG. 10(a) has a distorted pore structure, and circular large pore structures tend to appear as the L/S ratio increases. This is because, as previously considered, curing was delayed and silicon sufficiently reacted, with the increase of the L/S ratio, resulting in a large level of expansion.

Figure 11:
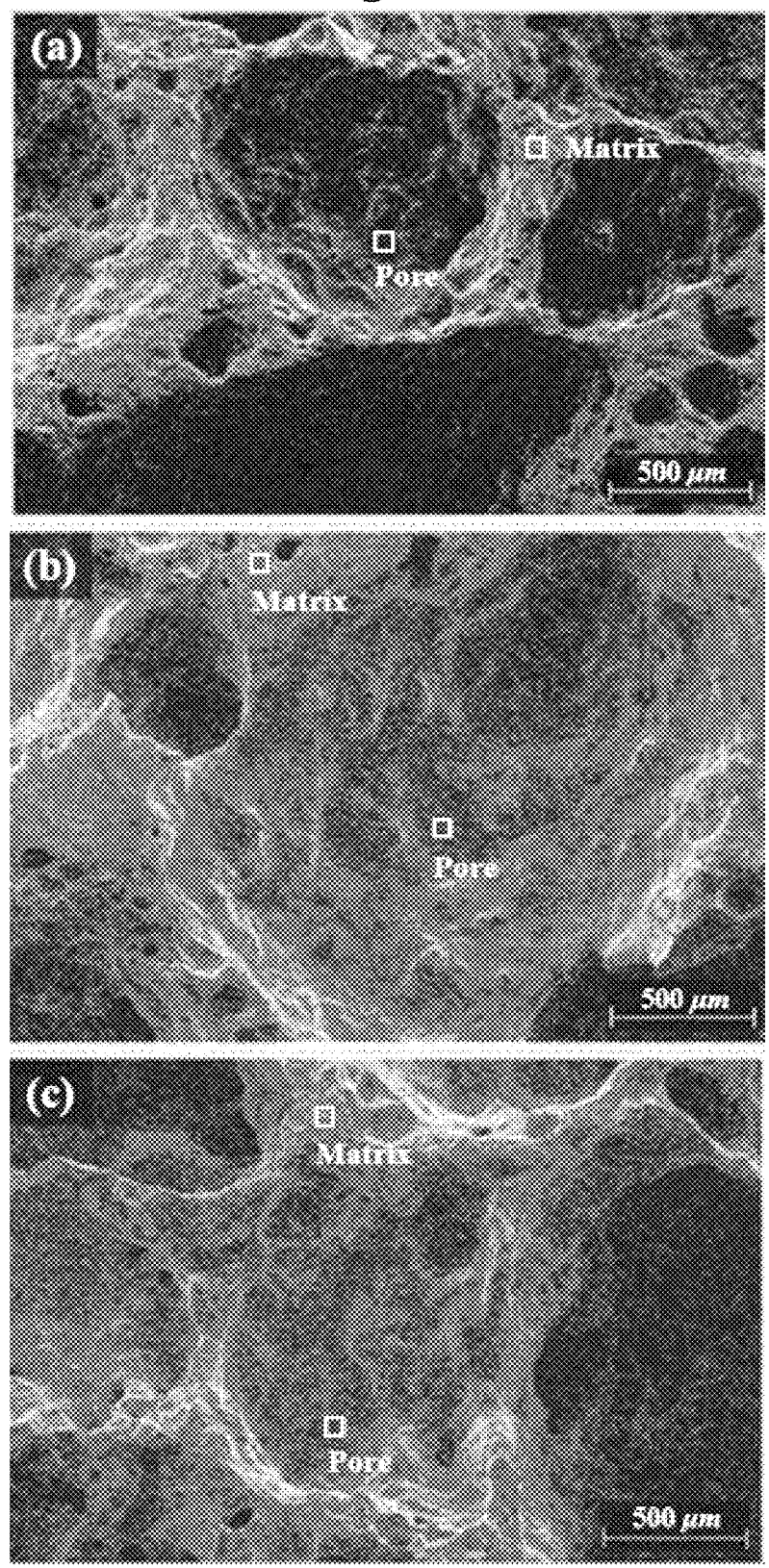
FIG. 11 shows SEM images and EDS analysis points of (a) 46FA10, (b) 46FA30, and (c) 46FA50 according to the present disclosure (20.0 kV, ×50).

Geopolymer foam shows different pore structures for respective groups. FIG. 11 shows SEM images for EDS measurement areas of 46FA10, 46FA30, and 46FA50 samples and element content results in EDS measurement areas for each sample, and Si/Al and Si/Na ratios calculated on the basis thereof are summarized in Table 3. In the images of all samples, a somewhat unsmooth structure is observed inside the pores because unreacted bottom ash particles are present in the structure. Although changes in pore structure were not clearly observed on the SEM images according to the groups, changes in the Si/Al ratio inside the pores were obvious as analyzed for elements in the structure by EDS. The Si/Al ratio generally represents a measure of the geopolymerization, but may account for the degree of participation of the water glass in the geopolymerization because a large amount of cured water glass exists in addition to the geopolymer structure. As opposed to the geopolymer that is in an aluminosilicate structure with an Si/Al ratio of 1-4, water glass, which consists of $SiO_2$ and $Na_2O$, allows the detection of large amounts of Si and Na, together with a small amount of Al if not participating in the reaction. As seen in the data of Table 3, Si/Al ratios are similar within the matrixes of all samples, but greatly differ from each other on the pore surface parts. Particularly, the Si/Al ratio is as very high as 16.55 on the pore surface of 46FA10 sample and decreases in 46FA30 sample and further in 46FA50 sample. This high Si/Al ratio implies that the pore surface and the interior near the surface are composed mostly of a cured water glass structure, resulting from the low reactivity of bottom ash. The Si/Al ratio, although decreasing with increasing of the fly ash content, remains higher than that in the matrix, indicating that there is still a lot of cured water glass.

TABLE 3

| | Sample | Si | Al | Na | O | Si/Al | Si/Na |
|---|---|---|---|---|---|---|---|
| Matrix | 46FA10 | 18.33 | 7.377 | 5.656 | 68.63 | 2.485 | 3.241 |
| | 46FA30 | 19.19 | 8.969 | 7.022 | 64.82 | 2.139 | 2.732 |
| | 46FA50 | 17.36 | 7.474 | 3.756 | 71.41 | 2.323 | 4.622 |
| Pore | 46FA10 | 20.92 | 1.264 | 14.01 | 63.80 | 16.55 | 1.493 |
| | 46FA30 | 19.91 | 3.009 | 12.74 | 64.35 | 6.616 | 1.563 |
| | 46FA50 | 20.02 | 3.880 | 12.17 | 63.93 | 5.161 | 1.646 |

6. TG/DTG and DIL

Figure 12:
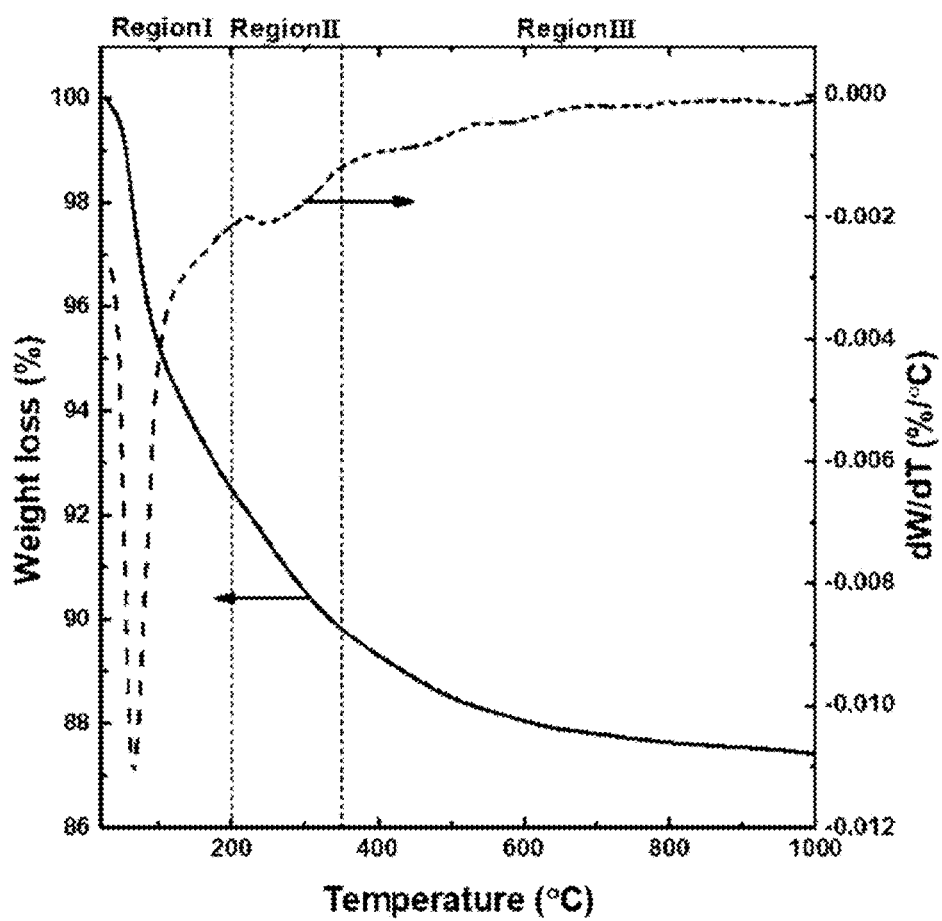
FIG. 12 shows TG/DTG curves of 46FA30 samples according to the present disclosure.

TG/DTG and DIL analyses provide change behaviors in mass and length of samples exposed to high temperatures, respectively. Interpretation of the results from the two analyses together allows the effective analysis of physicochemical structural changes in the target sample. FIG. 12 shows TG/DTG curves of 46FA30 sample. The curves can be divided into the following three regions according to mass loss behaviors. Mass loss was made in a steep and great pattern in region I (room temperature—200° C.), in a relatively slow pattern in region II (200-350° C.), and in a small but continuous pattern in region III (350-1000° C.). These regions are generated by respective different factors. Region I is generated as the moisture present in the geopolymer foam structure (physically bound water) evaporates. This moisture exists outside the geopolymer structure or in the form bound physically to the OH structure of the surface of the geopolymer and silanol group, accounting for most of the total mass loss. In the temperature range of as low as 100-150° C., moisture present in the geopolymer structure, along with free water, evaporates to cause a rapid mass loss. In the temperature range of 150-200° C., the moisture physically bound to silicate evaporates to cause a slow mass loss. The physically bound moisture is removed when the temperature reaches 200° C. In region II (200-350° C.), a relatively slow mass loss was observed due to the evaporation of the water chemically bound to the geopolymer structure and the dehydroxylation of silanol groups. The chemically bound moisture is known to evaporate in the range of the lower temperatures 100-300° C., but did not appear as peaks on the DTG curve because the physically bound moisture evaporated at a large level in the temperature range of 100-150° C. The chemically bound moisture appeared as a weak peak after 200° C. or higher at which evaporation of physical moisture was completed. At 300° C. or higher, the mass gradually decreased because the silanol group underwent dehydroxylation with the concomitant generation of siloxane bonds and water. In region III, T-OH of the geopolymer was dehydroxylated, along with the continuous dehydroxylation of silanol groups, to cause a small level of mass loss.

Figure 13:
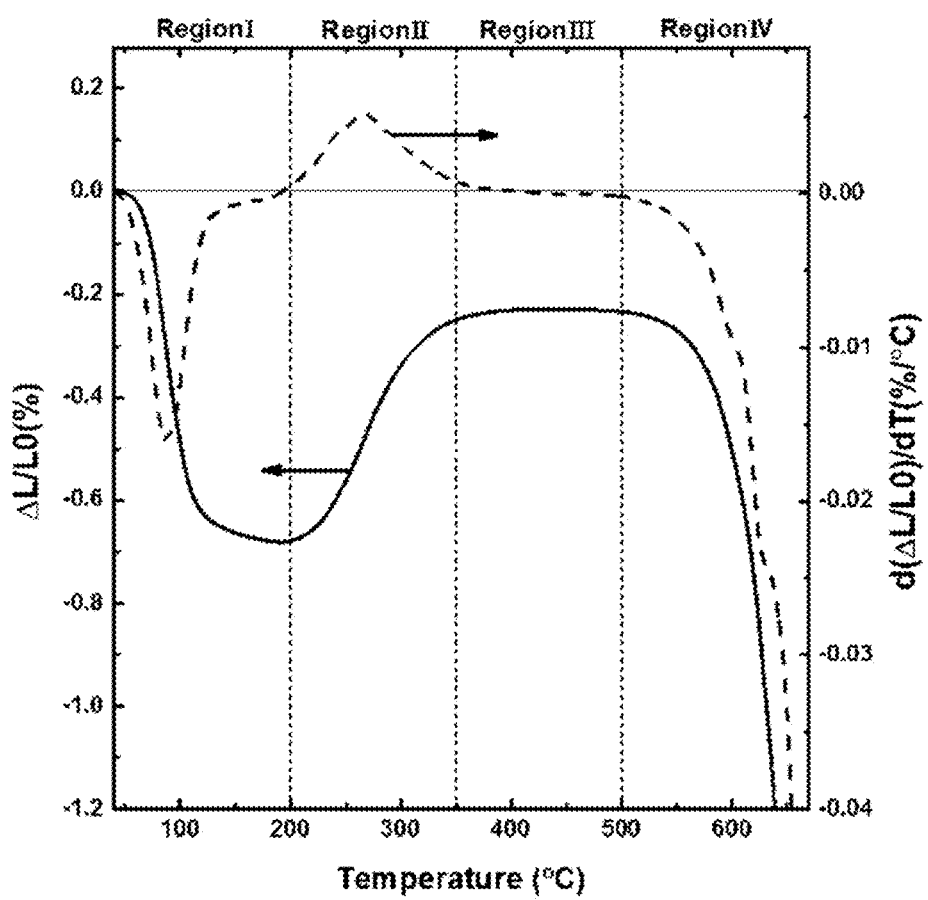
FIG. 13 shows DIL results of 46FA30 samples according to the present disclosure, together with a corresponding differential curve.

This phenomenon at high temperatures is associated with the length change behavior of the geopolymer foam. FIG. 13 shows DIL results of 46FA30, along with a differential curve based on the result. At 700° C. or higher, a very large level of shrinkage occurred and could not be measured due to the limitation of the analyzer. Accordingly, only the results below 700° C. were presented. As previously shown in the cross-sectional images of the sample, all of the samples were expanded except for the case where the samples were exposed to a temperature of 600° C., but despite their expansion behavior at 200-400° C., the samples were contracted compared to their original length, as analyzed by DIL. This is due to the fact that a small force of 30 cN applied during DIL measurement may have inhibited free expansion or the expansion may have been limited because of heating within the frame of the measuring device. Nevertheless, the length change behavior according to the exposure temperature provides useful information as follows.

The length change behaviors of the samples are divided into the three regions corresponding to the TG/DTG data and one additional region. The samples were observed to shrink in region I (room temperater—200° C.), expand in region II (200-350° C.), remain unchanged in region III (350-500° C.), and undergo great shrinkage in the last region IV (500° C.–). As previously contemplated for TG/DTG analysis data, when the geopolymer foam sample is exposed to high temperatures, the geopolymer structure and cured water glass undergo dehydration and dehydroxylation in different temperature ranges, and the resulting peak appears as a result of many overlapping reactions. In region I where the physically bound water evaporates as described above, the evaporation of the water bound to the geopolymer structure and the free water was reported to cause the geopolymer to shrink. This is coincident with the shrinkage of the samples observed at 150° C. or less. At 150-200° C., the DIL data show a tendency to shrink, but the sample exposed to a temperature of 200° C. actually expands. This difference is attributed to the fact that the samples did not freely expand upon DIL measurement. Actually, the water physically and chemically bound to the cured water glass might affect the expansion of the sample. This expansion behavior of the sample is contrary to the research data that bulk shrinkage occurs when the chemically bound water in the geopolymer structure is removed. This contrary data is considered to result from the fact that the chemically bound water of the cured water glass inside the sample evaporates out and is captured within the foam structure. Thus, the data implies that the foam structure consisting of geopolymer and cured water glass does not have complete brittleness even after curing. The expansion in region III well matches with the expansion of the sample exposed to the actual temperature, for which the water molecules produced as a result of the dehydroxylation of silanol groups escapes in the form of water vapor at high temperatures from the sample, causing the structural expansion. In region N, T-OH continues to undergo dehydroxylation, but drastic shrinkage proceeds as the secondary structure of the cured water glass is softened and sintered.

Figure 14:
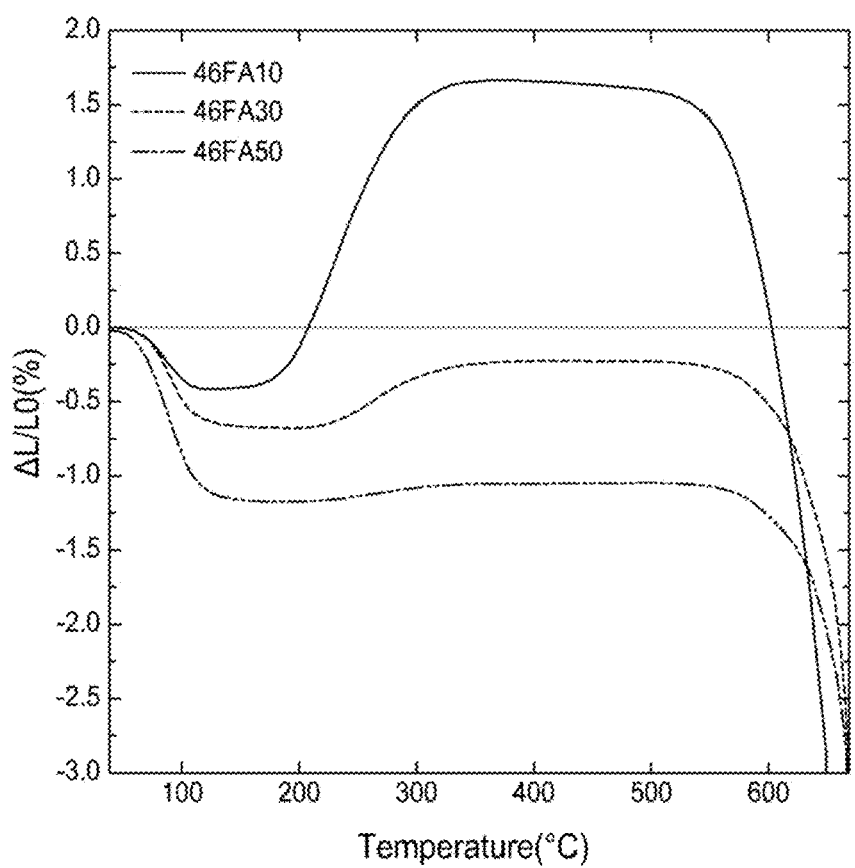
FIG. 14 shows DIL results of 46FA10, 46FA30, and 46FA50 samples according to the present disclosure.
Figure 15:
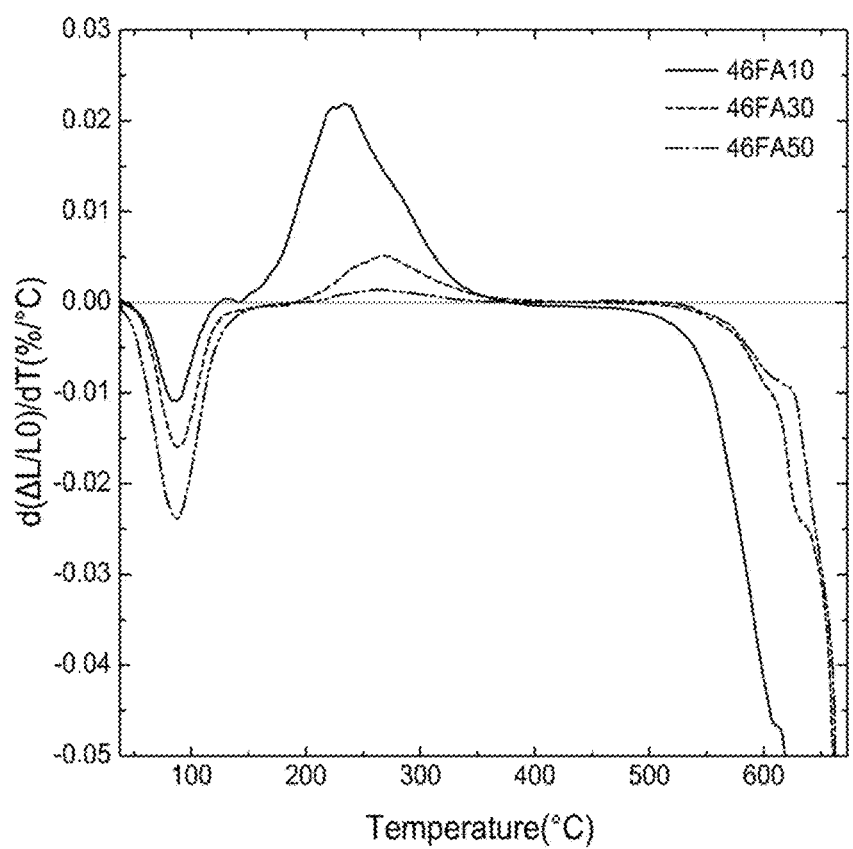
FIG. 15 shows differential curves of DIL results of 46FA10, 46FA30, and 46FA50 samples according to the present disclosure.

DIL analysis was performed on 46FA10, 46FA30, and 46FA50 samples to confirm the length change behavior of the sample depending on the fly ash content, and the results are shown in FIG. 14. Likewise, at 700° C. or higher, a very large level of shrinkage occurred and could not be measured due to the limitation of the analyzer. Accordingly, only the results below 700° C. were presented. In addition, unlike the expansion when the samples were exposed to a temperature of 200-400° C. for 2 hours, the samples except 46FA10 tended to shrink, compared to the original length, as can be seen in the curves of FIG. 14. As stated above, this shrinkage is because the expansion of the sample was limited within the analyzer. FIG. 15 shows differential curves based on the analysis data. Similar length change behaviors are observed due to the shrinkage and expansion mechanisms considered above, but differences in the degree of length change and the temperature at which expansion and contraction begin are observed for each sample group. The sample with a smaller content of fly ash (46FA10) was less likely to undergo shrinkage at the early stage of heating. After the stage, the sample expanded to a large level and then drastically. In addition, 46FA10 sample begun to expand at 125° C. and to shrink at 375° C. whereas 46FA30 and 46FA50 begun to both expand at 191° C. and to shrink at 435° C. and 510° C., respectively. This difference is attributed to the amounts of residual water glass.

If a large amount of geopolymer structures is not produced, chemical moisture may evaporate even at low temperatures because it remains weakly bonded. Referring to results of previous studies for the geopolymer that starts to expand at a temperature of as low as 80° C., it can be assumed that the shrinkage due to evaporation of physically bound water and the expansion due to evaporation of chemically bound water overlap in the early stage of heating. Therefore, 46FA10 sample showed a tendency to shrink to a relatively small extent because the geopolymer structure was small and the chemically bound water evaporated quickly. In addition, the amount of Si determines the softening temperature, and it is reported that a geopolymer with a higher content of Si relative to Al undergoes faster expansion and shrinkage. This report is coincident with the above-mentioned EDS data in which 46FA10 sample exhibited the fast expansion and shrinkage tendency when account is taken of the Si/Al ratio thereof as high as 16.55. In addition, since a high content of Si means that a lot of cured water glass remains due to poor formation of the geopolymer structure, a large amount of water vapor generated by dehydroxylation of the silanol group of water glass contributed to the large expansion of 46FA10. At 600-700° C., samples with lower fly ash contents (46FA10) exhibited faster and more drastic shrinkage. Likewise, consisting of abundant cured water glass and a large amount of water glass and a secondary structure of water glass, 46FA10 sample shrinks fast due to the softening and sintering of the structures.

<Test Example 2> Change in Physical Properties of Silica Fume-Added, Coal Ash-Based Geopolymer Foam at High Temperature (Physical Property Change with Exposure Temperature)

1. Macroscopic Structural Observation

Figure 16:
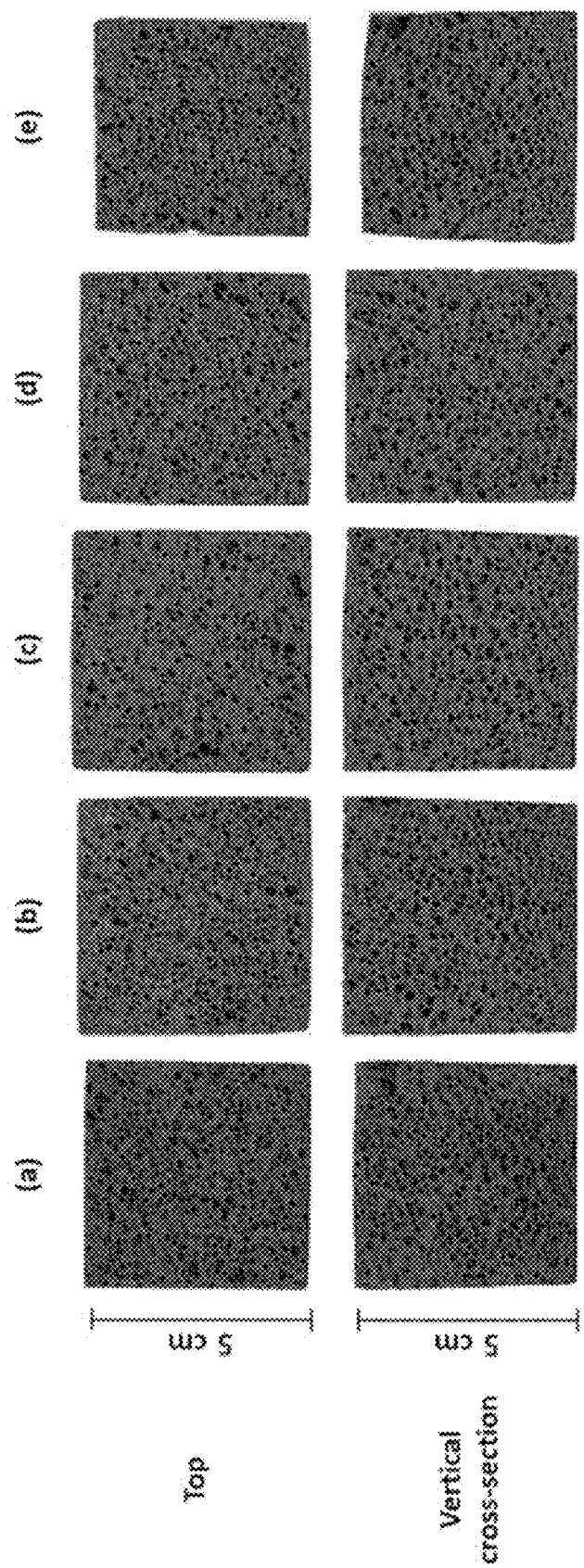
FIG. 16 shows images of top and vertically cross-sectional surfaces of the 46FA30 samples exposed to high temperatures according to the present disclosure. (a) 200° C., (b) 300° C., (c) 400° C., (d) 500° C., and (e) 600° C.

Research on exposure to high temperatures has been conducted to remove moisture present in the geopolymer foam. First, in order to investigate temperature regions for use in temperature exposure of the samples, 46FA30 sample was exposed to a temperature of 200, 300, 400, 500, and 600° C., and corresponding changes in physical properties were examined. FIG. 16 shows images of tops and vertical cross-sections of 46FA30 samples according to exposure to high temperatures. While being exposed to high temperatures, the sample expands, with the higher increment of expansion in the range of 200-400° C. However, the samples began to shrink upon exposure to a temperature of 500° C. The shrinkage further proceeded for the height of the samples to be reduced below 5 cm upon exposure to a temperature of 600° C. Thus, the samples exposed to a temperature of 600° C. could not be examined for physical properties other than thermal conductivity.

In addition, as the exposure temperature rises, the sample expands and shrinks to a relatively small extent at the bottom thereof but to a large extent at the top thereof. Such uneven expansion results from the inhomogeneity of the pore structure itself in the sample. It is known that this expansion phenomenon is attributed to the cure water glass. The sample has a dense geopolymer formed at the bottom thereof and thus undergoes a little size change at the bottom even when exposed to high temperatures. In contrast, the top of the sample, which consists of the geopolymer structure and the cured water glass, exhibits a significant size change upon exposure to high temperatures due to the cured water glass.

2. ATR-FTIR

Figure 17:
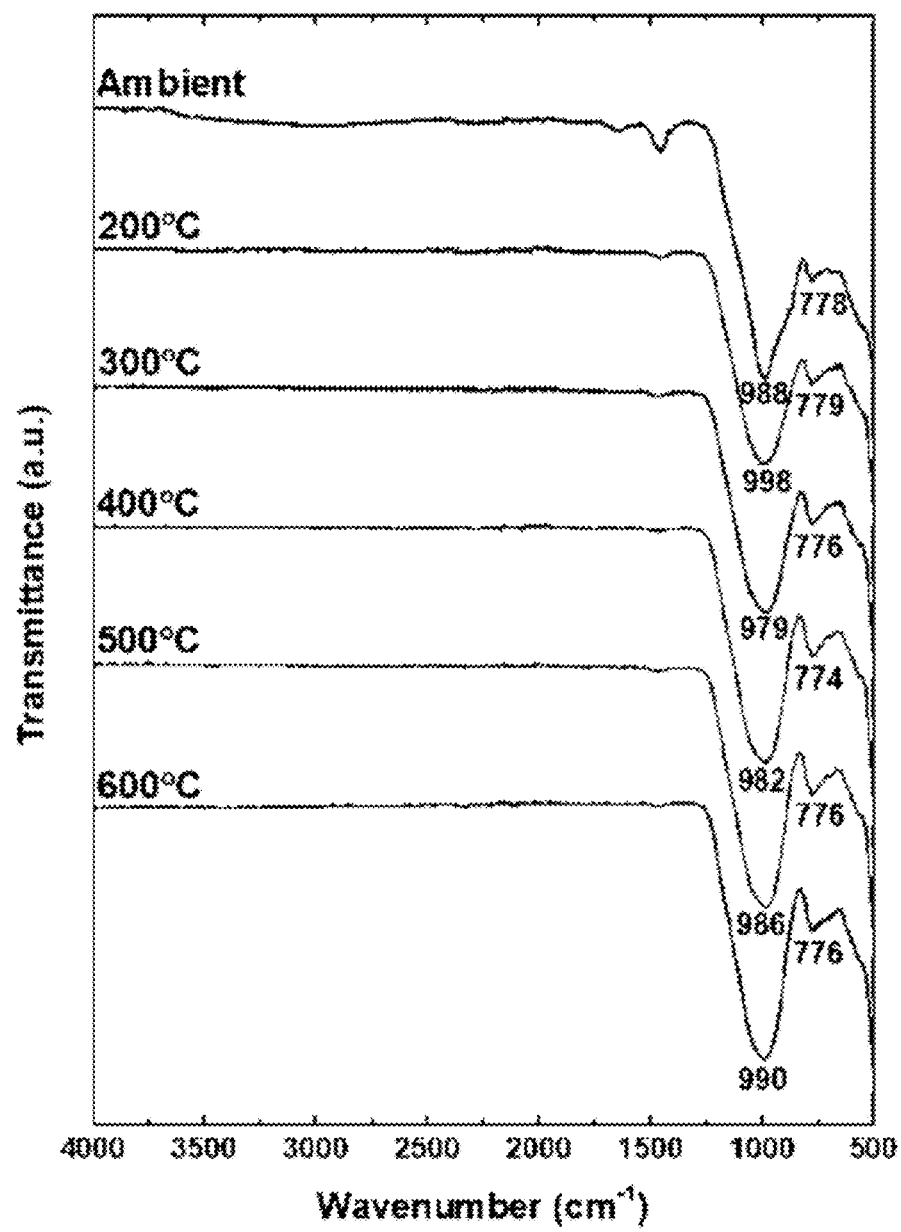
FIG. 17 shows ATR-FTIR spectra of 46FA30 samples exposed to high temperatures according to the present disclosure.

ATR-FTIR analysis was conducted to examine physicochemical structural changes of the geopolymer foam, and the data is depicted in FIG. 17. A broad, intense peak in the range of 800-1250 $cm^{-1}$ is detected in each spectrum. Considering the geopolymer foam structure and the geopolymer foam components including silicate and silicate reaction product, the appearance of the peaks is accounted for by two factors. First, the peak is ascribed to T-O (T: Si or Al) asymmetric stretching vibration in the geopolymer structure. The geopolymerization is achieved by forming an aluminosilicate structure through hydrolysis and polycondensation of Si—OH and Al—OH species eluted from raw materials. Since the Al—O bond is weaker in energy and more unstable than the Si—O bond, the components including Al are rapidly eluted from the raw material to form an Al-rich geopolymer structure. As the polymerization proceeds, Si elements are dissolved and are incorporated into the geopolymer structure. As a result, the corresponding peak is known to move toward higher wavenumber values. In FIG. 17, the wavenumber of the main peak moved from 988 $cm^{-1}$ to 998 $cm^{-1}$. This resulted from the removal of the reaction product water by which the geopolymerization was accelerated to incorporate a large amount of Si into the geopolymer structure. However, exposure of the sample to 300° C. greatly decreased the wavenumber to 979 $cm^{-1}$, which means incorporation of Al into the aluminosilicate structure, or depolymerization. Due to exposure to high temperatures, Al may be additionally eluted from the raw material that remains unreacted, and incorporated into the geopolymer structure. Alternatively, the expansion of the sample may break the bond between the aluminosilicate structures of the geopolymer, resulting in depolymerization. As the temperature rises above 300° C., the main peak moves again toward high wavenumber values. This phenomenon is associated with a chemical structural change of the silanol group. A silanol group undergoes dehydroxylation to form the siloxane (Si—O—Si) bond. Accordingly, the degree of polymerization of Si Si bonds increases. With the increase of the degree of polymerization increases, the main peak moves toward high wavenumber values.

As the exposure temperature increases, the transmittance near 870 $cm^{-1}$ becomes weak while the peak at 780 $cm^{-1}$ becomes intense, making a clear pattern. The pattern near 870 $cm^{-1}$ is accounted for by Si—OH stretching and bending while the peak near 780 $cm^{-1}$ results from Si—O—Si symmetric stretching vibration. This change in peak intensity indicates that many Si—O—Si bonds are formed through condensation of silanol groups (Si—OH). In addition, a broad peak near 3400 $cm^{-1}$ and a weak peak at 1650 $cm^{-1}$ appeared on the spectrum of the sample that remained unexposed to high temperatures. These peaks are ascribed to water and disappeared upon exposure to a temperature of 200° C. or higher as a result of removing the water. Finally, the peak at 1450 $cm^{-1}$ is ascribed to $Na_2CO_3$ which is produced by reacting Na with carbon dioxide in air, and also disappeared upon exposure to high temperature.

3. XRD

Figure 18:
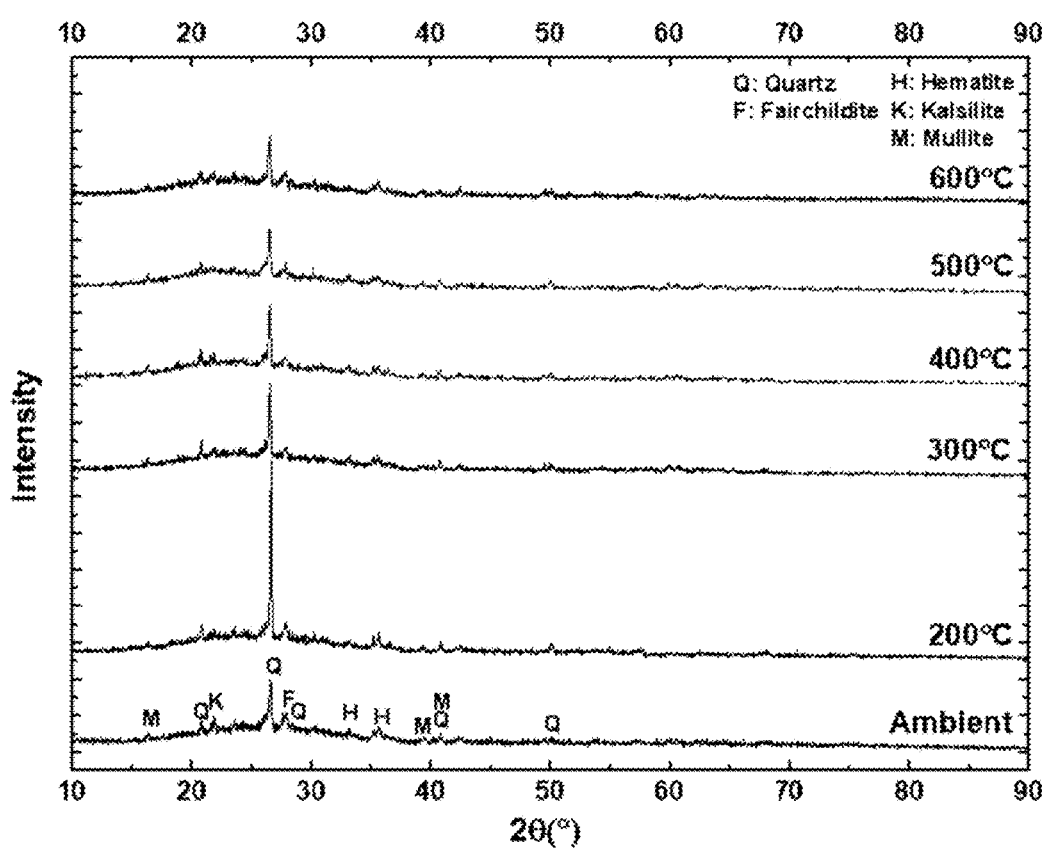
FIG. 18 shows XRD spectra of 46FA30 samples exposed or not exposed to temperatures of 200° C., 300° C., 400° C., 500° C., and 600° C. according to the present disclosure.

FIG. 18 shows XRD spectra of 46FA30 samples exposed to high temperatures. Although there are no changes in kinds of crystalline phases, peak intensities vary depending on exposure temperatures. The crystalline phase peak of quartz appears intense upon exposure to a temperature of 200° C. and tends to become weak with the increase of the exposure temperature. Since 200° C. is too relatively low a temperature to induce crystallization, the peak seems to appear intense due to the deformation of the bonds such as silanol groups and siloxanes, rather than crystalline formation. Upon exposure to a temperature of 300° C. or higher, the intensity of the peak decreased again, with the consequent appearance of an amorphous shape. This is coincident with the above-mentioned FTIR analysis data in which the wavenumber of the main peak increased and then decreased at 200-300° C.

4. Bulk Density and Porosity

Figure 19:
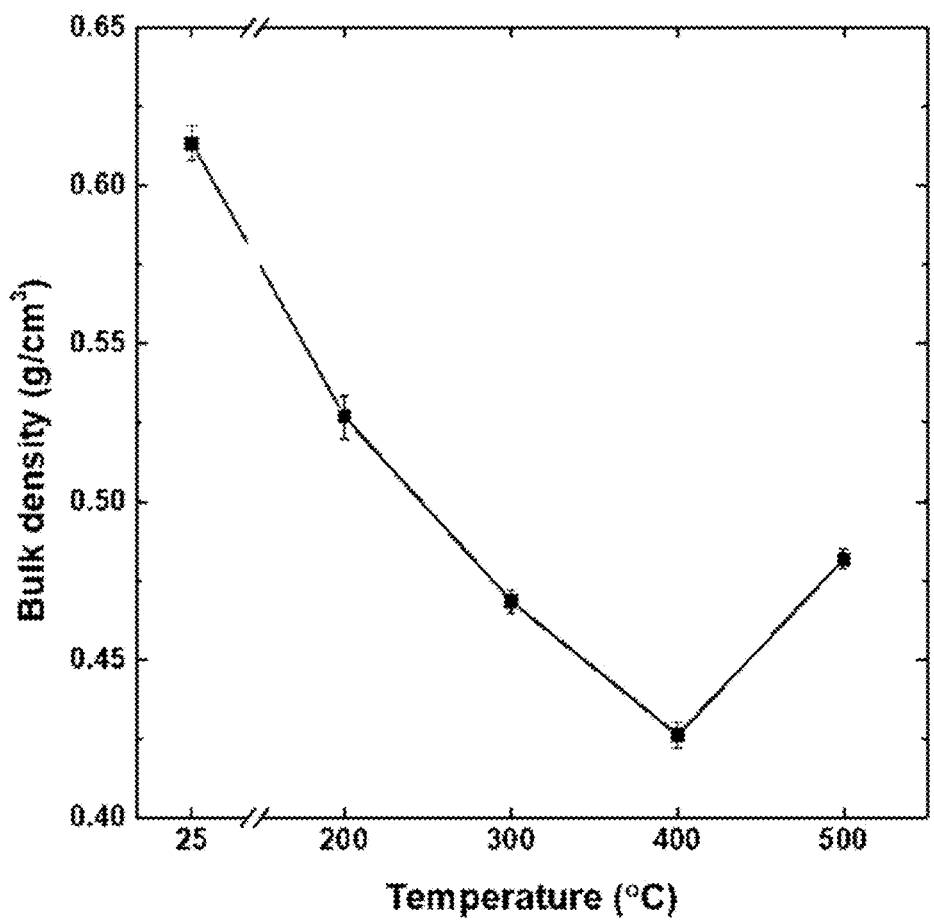
FIG. 19 shows bulk density measurements of 46FA30 samples exposed to various temperatures according to the present disclosure.
Figure 20:
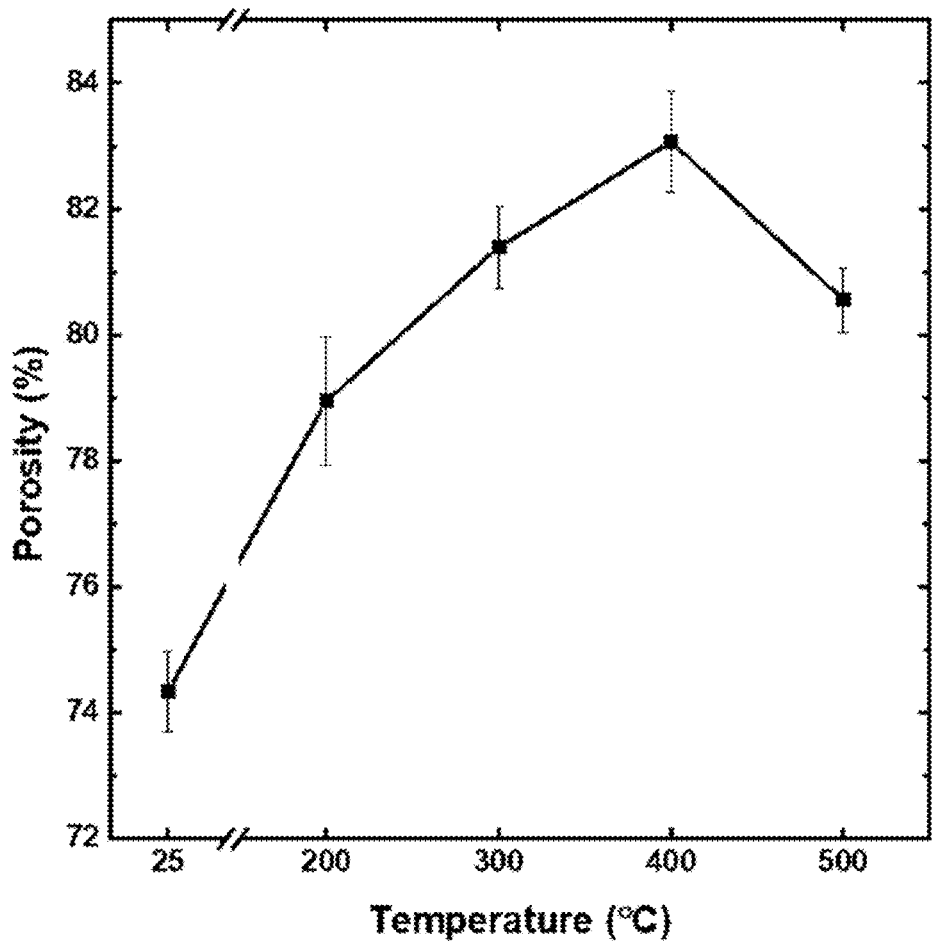
FIG. 20 shows porosity measurements of 46FA30 samples exposed to various temperatures according to the present disclosure.

All the specimens exposed to a temperature of 200-500° C. were in an expanded state. Thus, the expanded portions were trimmed with a diamond saw to prepare 5-cm cubic samples which were then analyzed for physical properties. As can be seen in FIG. 19, the samples expand with increasing of the exposure temperature. Correspondingly, the bulk density tends to decrease and then increase at 500° C. at which shrinkage starts. The porosity results of FIG. 20 show a tendency contrary to the bulk density and is well coincident with the expansion and shrinkage tendency of the sample.

5. Thermal Conductivity

Figure 21:
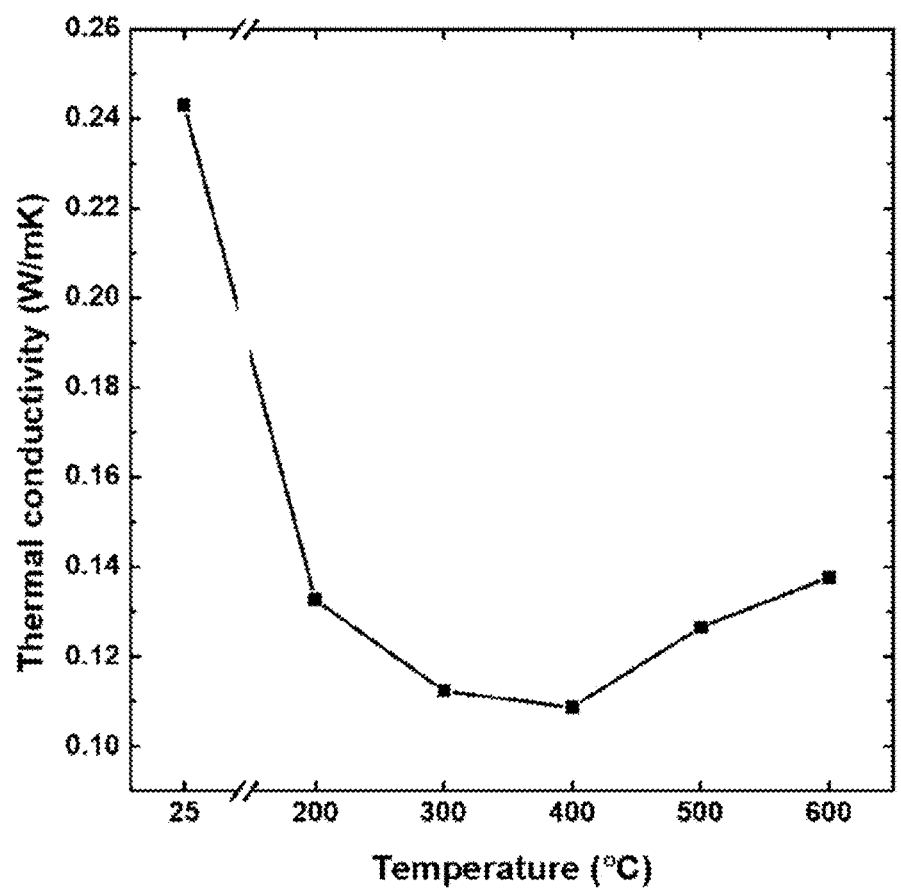
FIG. 21 shows thermal conductivity measurements of 46FA30 samples exposed to high temperatures according to the present disclosure.

FIG. 21 is a plot of thermal conductivity for 46FA30 samples exposed to a temperature of 200-600° C. Exposure to a temperature of 200° C. evaporated the physically bound water and expanded the samples, with the consequent great decrease of the thermal conductivity from 0.243 W/mK to 0.133 W/mK. Then, when exposed to a temperature of 300-400° C., the samples further decreased in thermal conductivity as a result of the sample expansion due to the above-mentioned dehydroxylation of the silanol group. However, after exposure to a temperature of 400° C., the thermal conductivity was measured to be 0.109 W/mK, showing a small decrement compared to the decreased thermal conductivity in the range of room temperature—200° C. This result implies that the removal of physically bound water greatly contributes to the reduction of thermal conductivity while the removal of chemically bound water and the sample expansion attributed to dehydroxylation make a relatively small contribution thereto.

6. Compressive Strength

Figure 22:
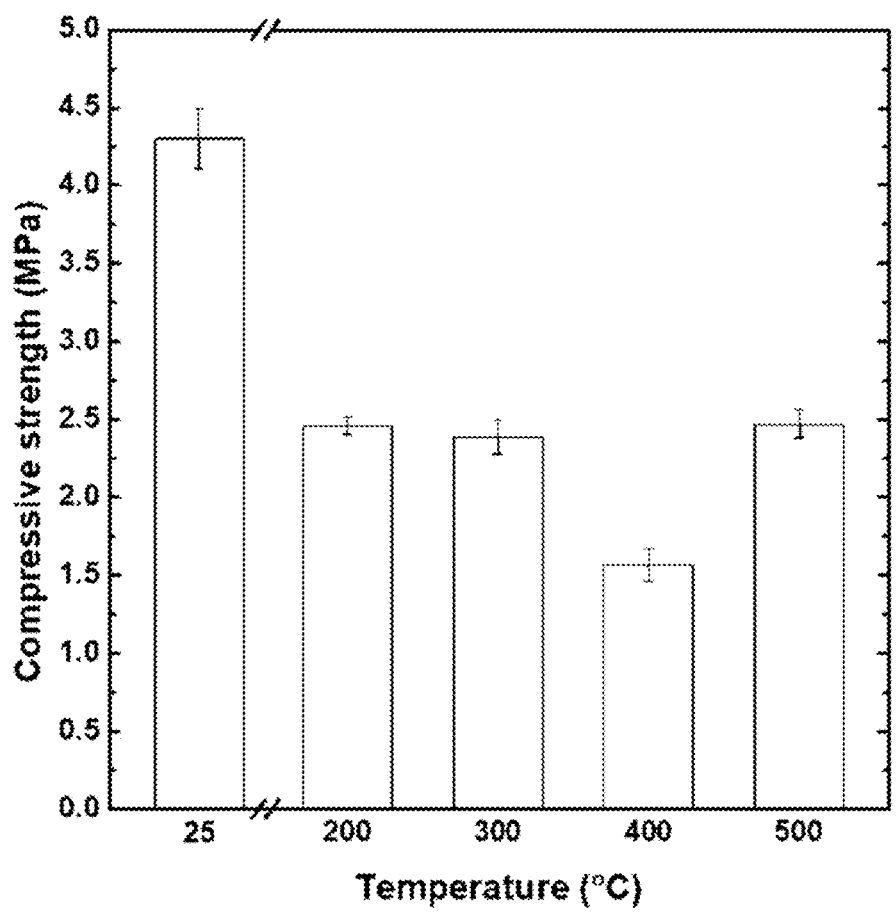
FIG. 22 shows compressive strength measurements of 46FA30 samples exposed to high temperatures according to the present disclosure.

FIG. 22 shows compressive strength measurements of 46FA30 exposed to a temperature of 200-500° C. As the exposure temperature rises to up to 400° C., a structure with very high porosity is formed due to expansion. Accordingly, the compressive strength shows a tendency to decrease, but increases again with the shrinkage of the sample at 500° C.

7. SEM

Figure 23:
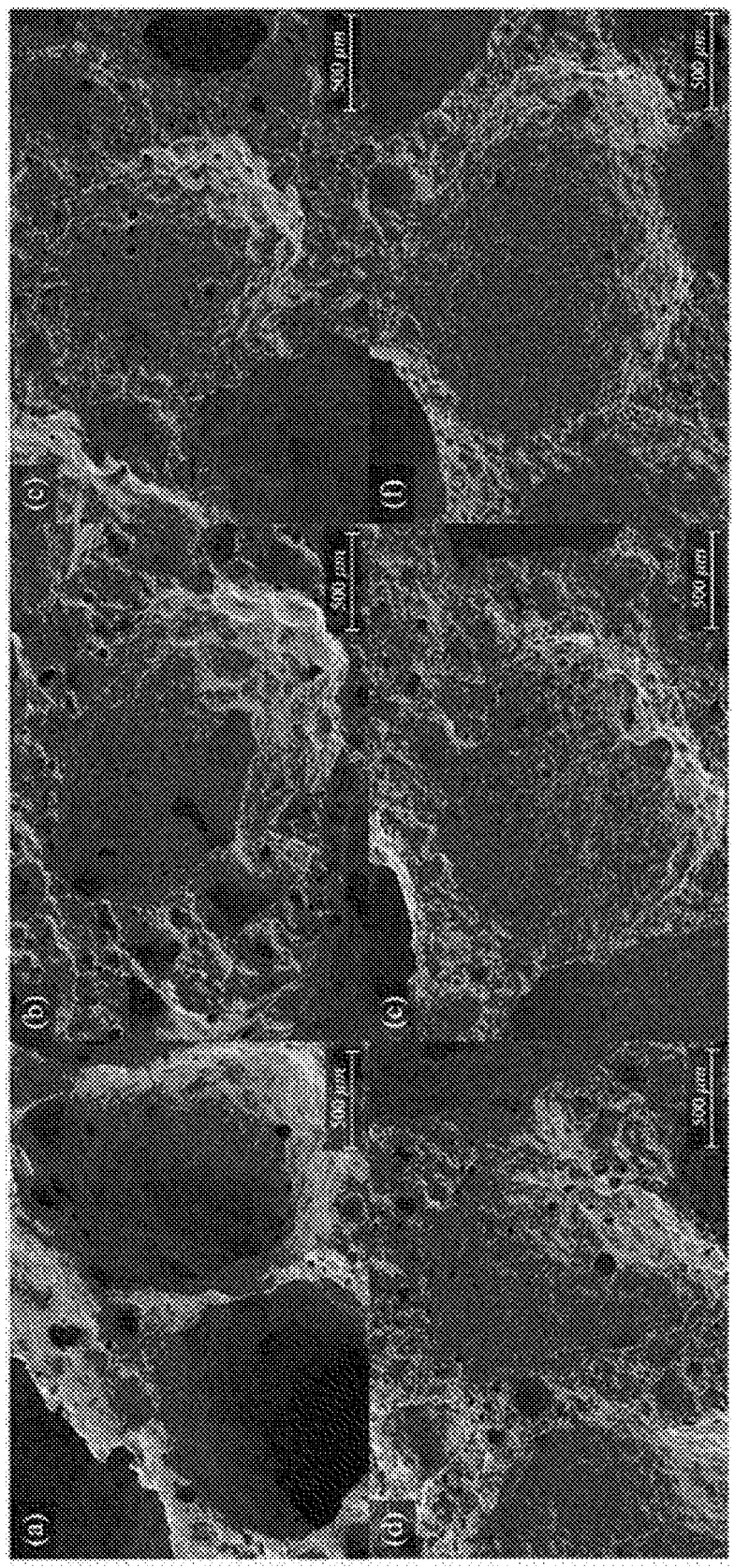
FIG. 23 shows SEM images of 46FA30 samples exposed to (a) ambient, (b) 200° C., (c) 300° C., (d) 400° C., (e) 500° C., and (f) 600° C. (5 kv, ×50) according to the present disclosure.

FIG. 23 shows SEM images of 46FA30 samples and the samples exposed to a temperature of as high as 200-600° C. In the sample of FIG. 23b, a plurality of convex bubble structures is observed inside the pores as a result of the evaporation of chemically bound water and the generation of vapors by dehydroxylation of silanol groups as stated in the thermal analysis section. This reaction also proceeded in the matrix part to form micropores, and the bubbles and microporous structure caused an increase in thermal conductivity and a decrease in compression strength. The convex bubble structures appeared as destroyed shapes after 400° C., and fine holes were formed in the place where the bubbles were destroyed. In the sample exposed to a temperature of 600° C., such fine holes were significantly reduced, demonstrating that the shrinkage of the sample proceeded. Based on these results, therefore, it can be assumed that the shrinkage of the sample exposed to high temperatures proceeds through the destruction of air bubbles and the reduction of micropores.

Subsequent experiments investigated changes in the thermal properties of the sample within a temperature range of 200-500° C., except for 600° C. at which severe shrinkage occurred.

<Test Example 3> Change in Physical Properties of Silica Fume-Added, Coal Ash-Based Geopolymer Foam at High Temperature (Physical Property Change with L/S Ratio)

1. Macroscopic Structural Observation

Figure 24:
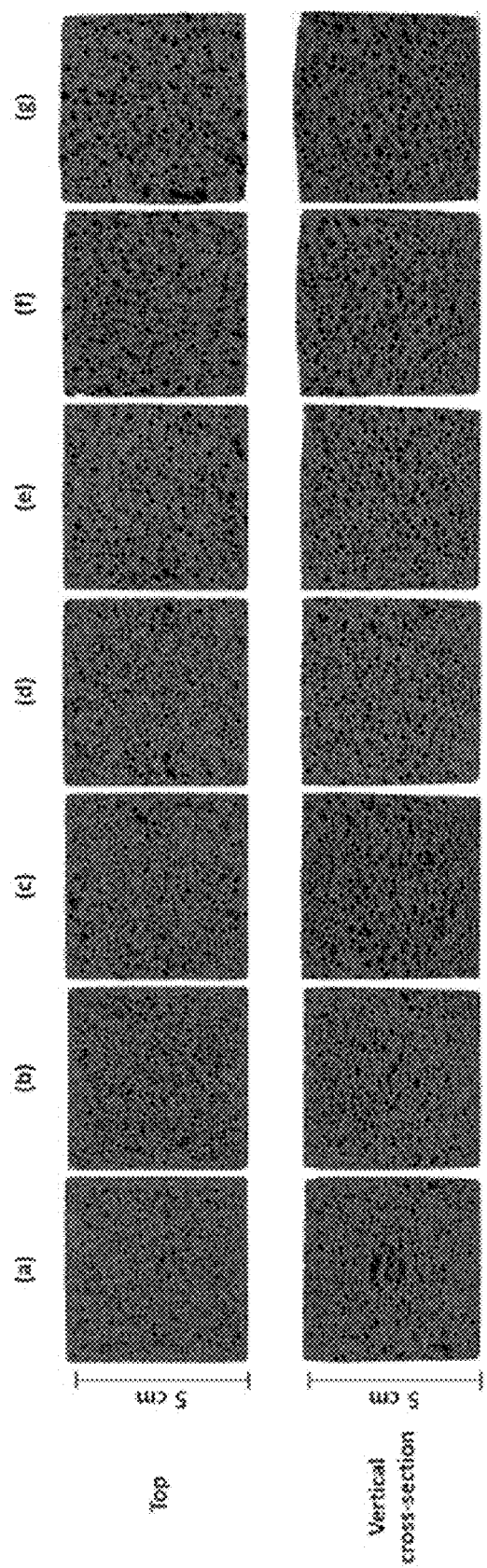
FIG. 24 shows images of top and vertically cross-sectional surfaces of FA30 samples having various L/S ratios after exposure to a temperature of 400° C. according to the present disclosure. (a) 0.38, (b) 0.40, (c) 0.42, (d) 0.44, (e) 0.46, (f) 0.48, (g) 0.50.

In order to observe changes in thermal properties according to the L/S ratio, all samples of the FA30 group were exposed to a temperature of 200-500° C., and images of the top and vertical cross-section of the representative samples exposed to a temperature of 400° C. are shown in FIG. 24. All samples expanded, and as the L/S ratio increased, the samples expanded to a larger level because of the presence of more residual water glass. After expansion, the sample had a very bulging top surface, and this morphology was more prominent in a sample with a higher L/S ratio. This expansion is due to inhomogeneity across the geopolymer foam.

2. Bulk Density and Porosity

Figure 25:
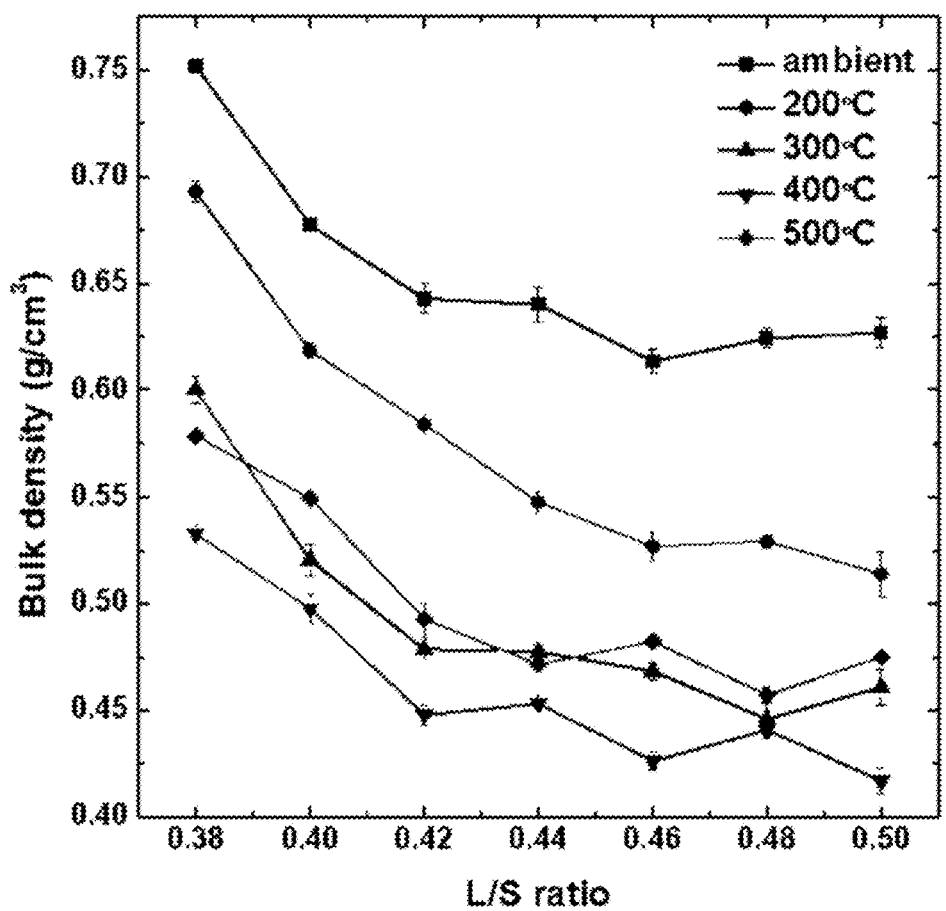
FIG. 25 shows bulk density measurements of FA30 samples against L/S ratio after exposure to high temperatures according to the present disclosure.
Figure 26:
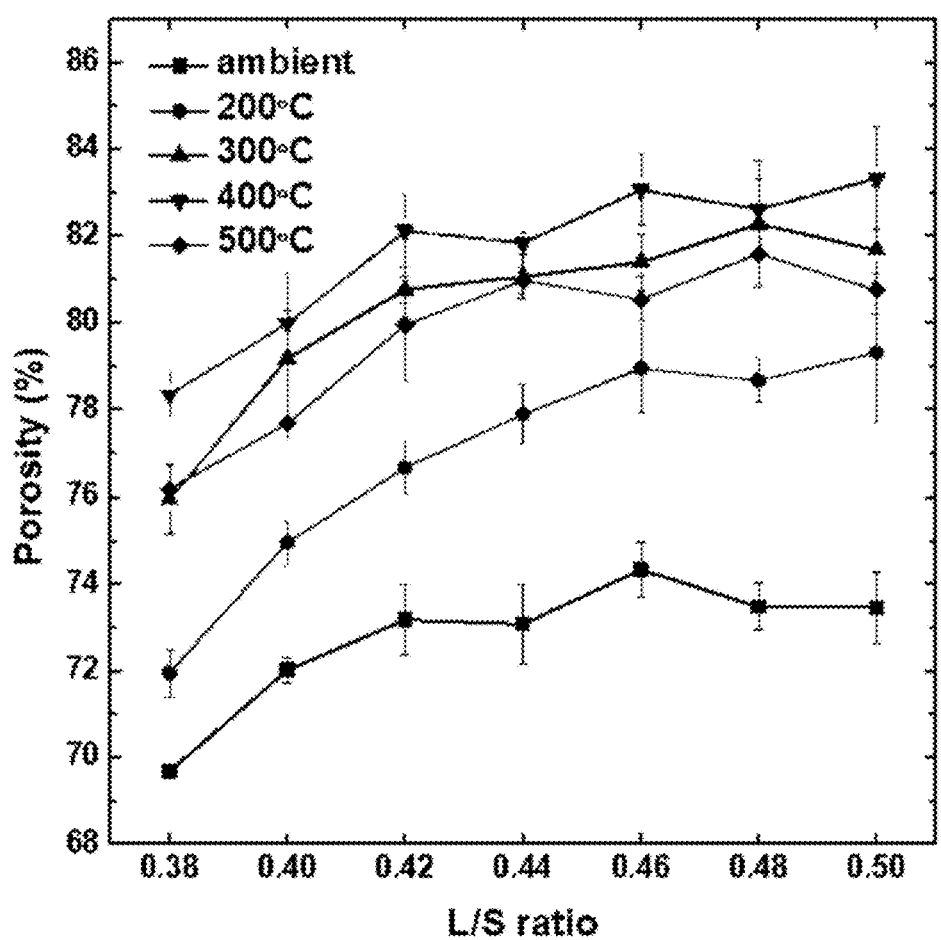
FIG. 26 shows porosity measurements of FA30 samples against L/S ratio after exposure to high temperatures according to the present disclosure.

FIGS. 25 and 26 show bulk density and porosity measurements of FA30 group samples exposed to a temperature of 200-500° C. according to L/S ratios. Likewise, as the expansion proceeded, samples with high L/S ratios greatly decreased in bulk density due to the presence of more residual water glass therein. When 50FA30 was exposed to a temperature of 400° C., a minimum bulk density of 0.417 g/cm$^3$ was achieved. The porosity results of FIG. 26 show a tendency contrary to the bulk density.

3. Thermal Conductivity

Figure 27:
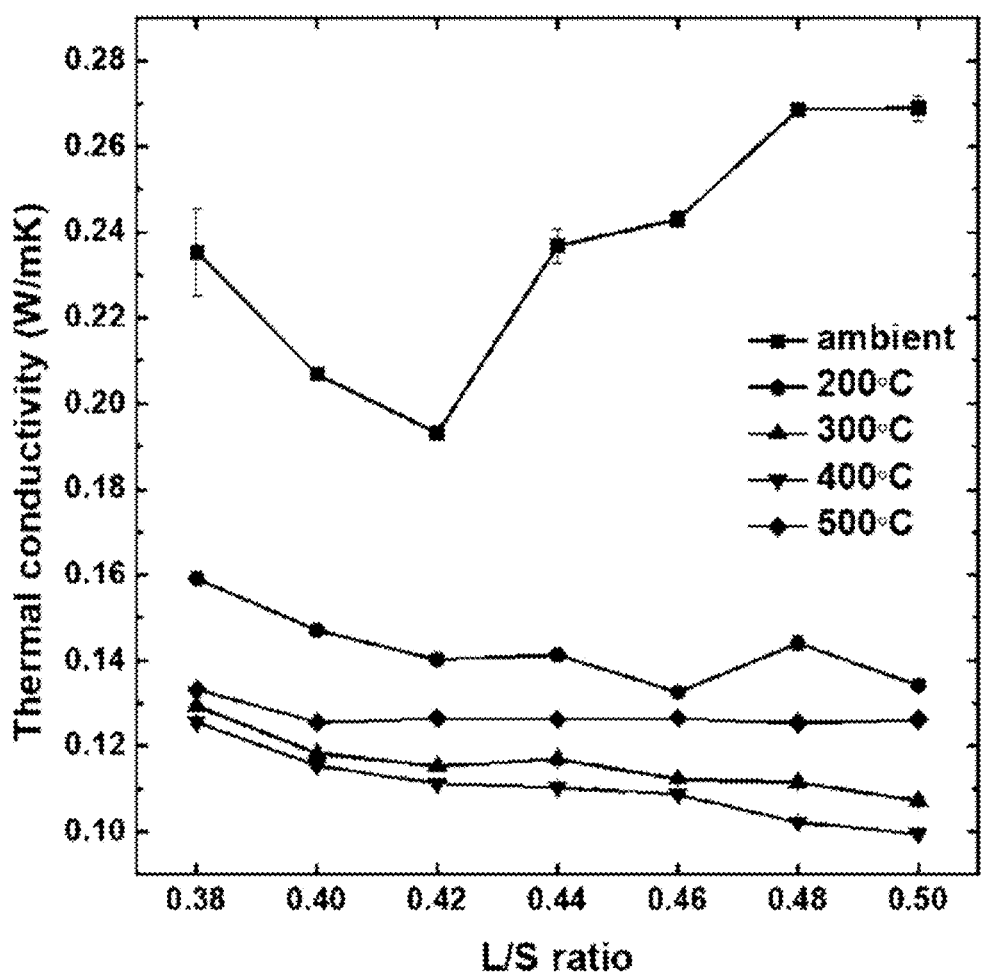
FIG. 27 shows thermal conductivity measurements of FA30 samples against L/S ratio after exposure to high temperatures according to the present disclosure.

FIG. 27 shows plots of thermal conductivity of FA30 group samples exposed to a temperature of 200-500° C. against L/S ratio. After exposure to a temperature of 200° C., all the samples underwent a great decrease in thermal conductivity. Then, when exposed to a temperature of 300-400° C., the samples further decreased in thermal conductivity, but exposure to a temperature of 500° C. increased again the thermal conductivity in the samples. In particular, after exposure to a temperature of 200° C., the samples with an L/S ratio of 0.44 or higher greatly decreased in thermal conductivity as much residual moisture present in the geopolymer foam evaporated after exposure to such a high temperature. Then, as the exposure temperature was elevated to 400° C., the samples with high L/S ratios exhibited a relatively significant decrease in thermal conductivity, with the lowest thermal conductivity of 0.0996 W/mK detected in 50FA30 sample. However, upon exposure to 500° C., the thermal conductivity of samples with a high L/S ratio was increased to a relatively large level, similar to that of samples with a low L/S ratio. These results suggest that the degree of expansion of the sample increases with increasing of the L/S ratio, but at the same time the degree of shrinkage may also increase.

4. Compressive Strength

Figure 28:
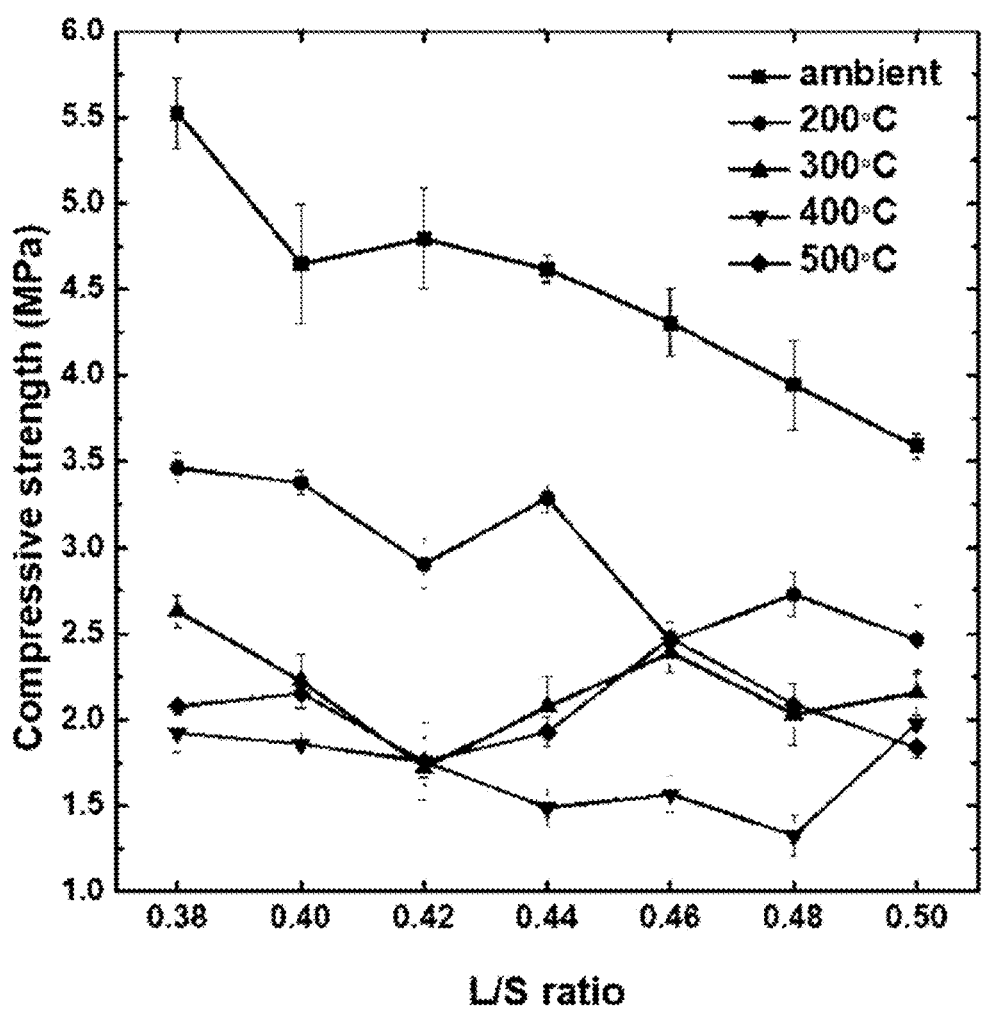
FIG. 28 shows compressive strength measurements of FA30 samples against L/S ratio after exposure to high temperatures according to the present disclosure.

FIG. 28 shows compressive strength measurements of FA30 group samples exposed to a temperature as high as 200-500° C. The samples show a tendency to decrease in compressive strength with increasing of the L/S ratio upon exposure to 200° C., but do not show any particular tendency after being exposed to a temperature of 300° C. or higher. This observation seems to be because the samples differ from one to another in terms of the start temperature and degree of expansion and shrinkage.

5. SEM

Figure 29:
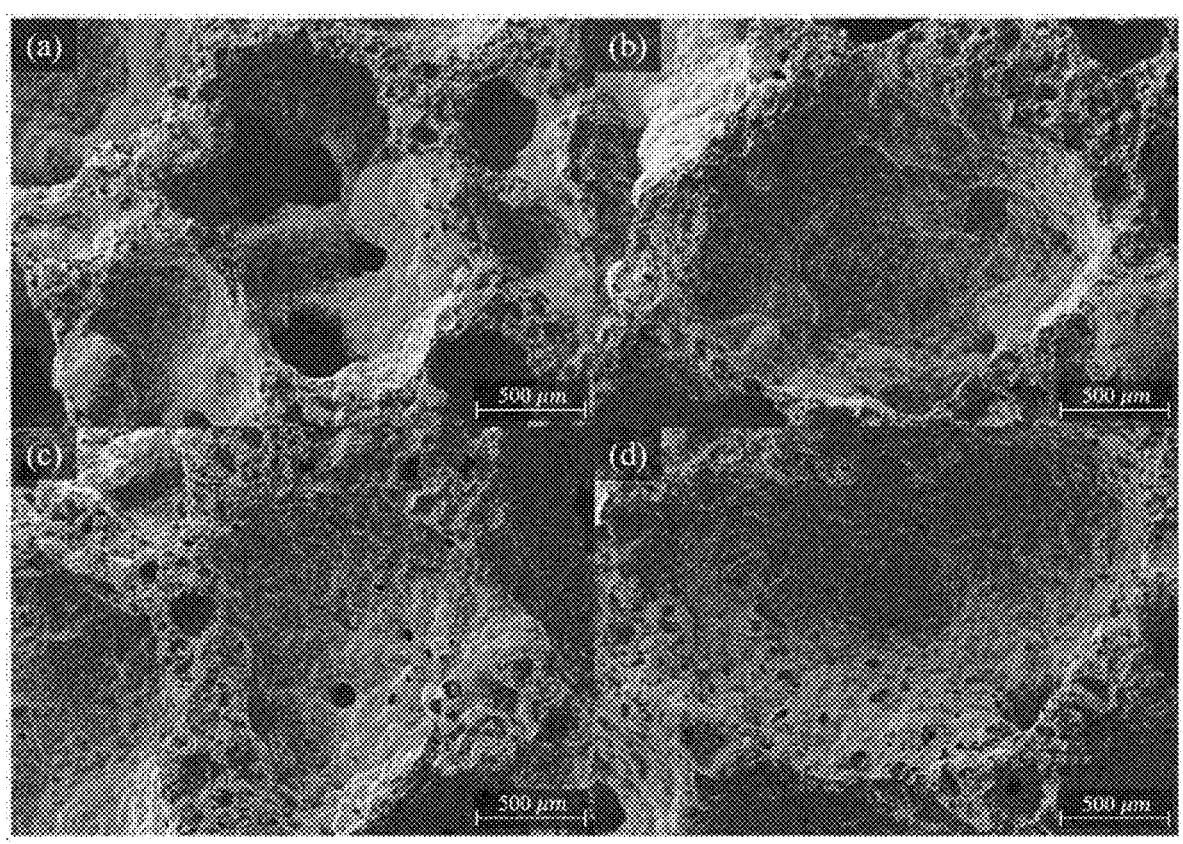
FIG. 29 shows SEM images of FA30 samples having L/S ratios and exposed to a temperature of 400° C. according to the present disclosure (5 kV, ×50). (a) 0.38, (b) 0.42, (c) 0.46, (d) 0.50.

FIG. 29 shows SEM images of FA30 group samples with L/S ratios of 0.38, 0.42, 0.46, and 0.50 after exposure to a temperature of 400° C. In samples with low L/S ratios, relatively smooth pore surfaces are observed. With the increase of the L/S ratio, microbubbles and pores increased because of the presence of more residual water glass and the formation of less dense geopolymer. This phenomenon is coincident with the previous thermal conductivity data obtained by increasing and decreasing the L/S ratio because the microbubbles and pores are factors that lower the thermal conductivity.

<Test Example 4> Change in Physical Properties of Silica Fume-Added, Coal Ash-Based Geopolymer Foam at High Temperature (Physical Property Change with Fly Ash Content)

1. Macroscopic Structural Observation

Figure 30:
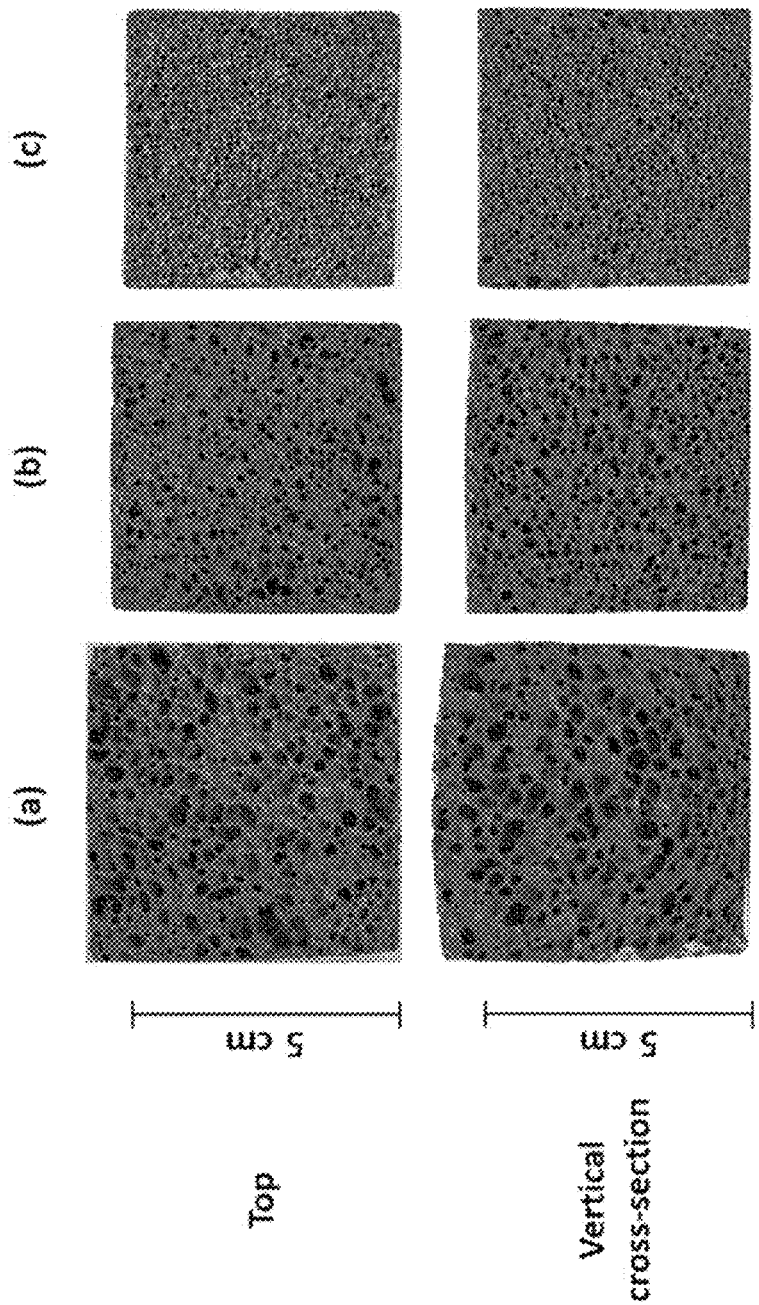
FIG. 30 shows images of top and vertically cross-sectional surfaces of the columns (a) 46FA10, (b) 46FA30, and (c) 46FA50 according to the present disclosure.

The samples of FA10, FA30, and FA50 groups were exposed to high temperatures to observe changes in the structural and physical properties of the foam that appear when exposed to high temperatures according to fly ash content. The samples were exposed to a temperature of 400° C., which was observed to be a temperature condition allowing for the lowest bulk density as analyzed in the previous test, and all L/S ratios for each group were investigated. First, in order to observe changes in foam structure, representative samples were determined as 46FA10, 46FA30, and 46FA50 for each group, and images of top and vertical cross-sectional surfaces of the samples were taken and are shown in FIG. 30. After exposure to high temperatures, all samples expanded, with higher expansion increments obtained from lower fly ash contents (46FA10). This difference occurs even under the same L/S ratio of 0.46 because the bottom ash particles have low reactivity. Due to the relatively poor geopolymerization, a large amount of water glass remained unreacted, causing a large expansion. As can be seen in FIG. 30c for the sample having a large amount of fly ash added thereto, the structure did not change significantly even after exposure to high temperatures, demonstrating relatively high thermal stability therein.

2. Bulk Density and Porosity

Figure 31:
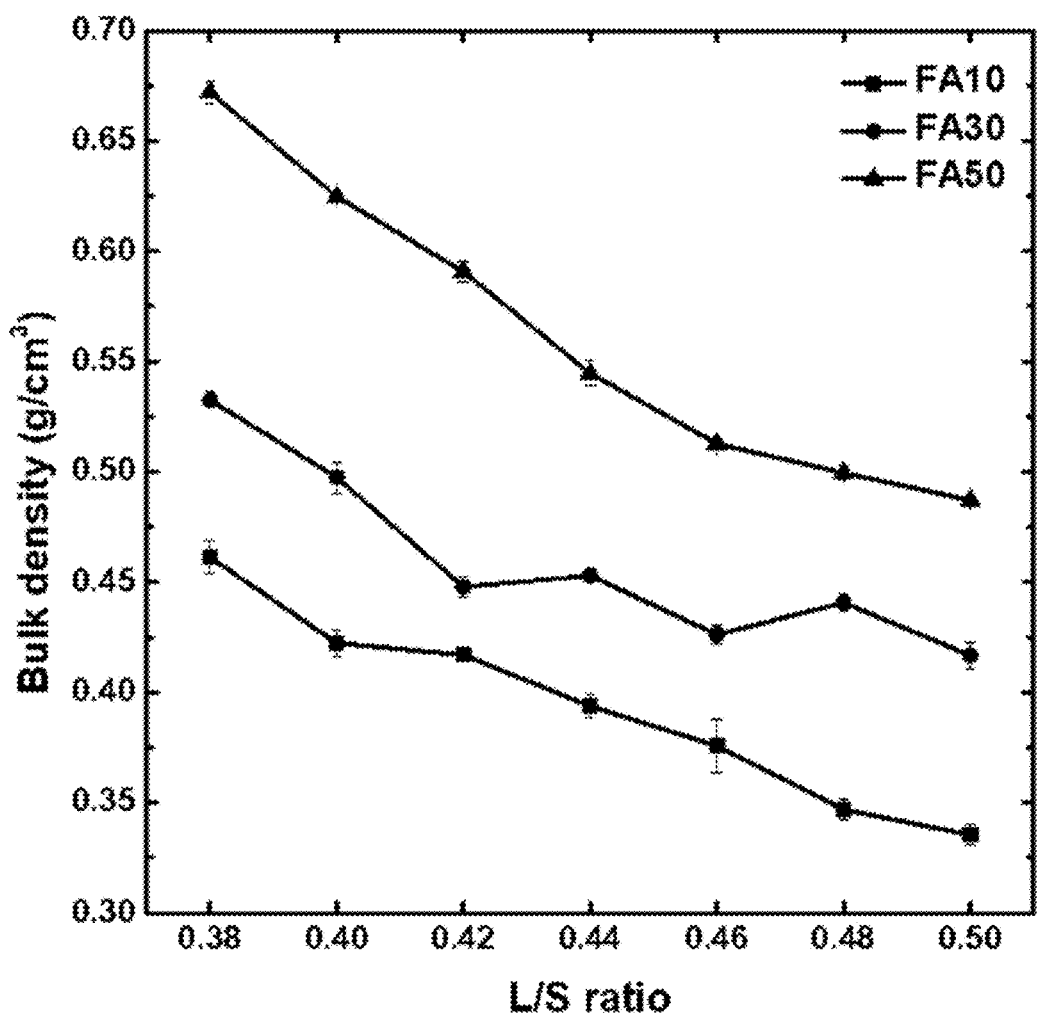
FIG. 31 shows bulk density measurement of FA10, FA30, and FA50 against L/S ratio after exposure to a temperature of 400° C. according to the present disclosure.
Figure 32:
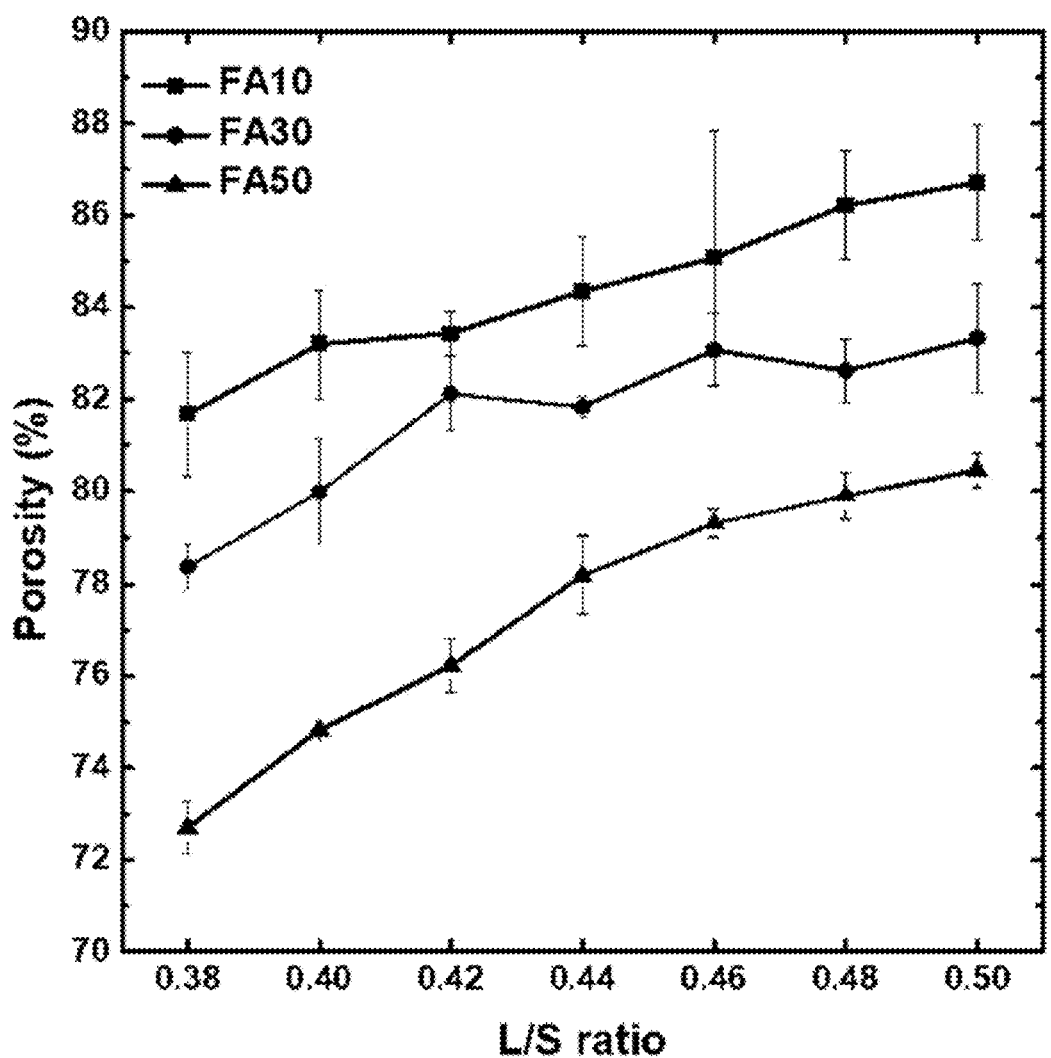
FIG. 32 shows porosity measurements of FA10, FA30, and FA50 against L/S ratio after exposure to a temperature of 400° C. according to the present disclosure.

Bulk density and porosity measurements of FA10, FA30 and FA50 groups exposed to a temperature of 400° C. are shown in FIGS. 31 and 32, respectively. Likewise, under the condition of a lower fly ash content (FA10) and a higher L/S ratio, more residual water glass is present, leading to a great reduction in bulk density. The minimum bulk density achievable for each sample group is 0.336 g/cm$^3$ for FA10, 0.417 g/cm$^3$ for FA30, and 0.487 g/cm$^3$ for FA50 under the condition of 0.50 L/S ratio. The porosity result of FIG. 32 shows a tendency opposite to the volume density result.

3. Thermal Conductivity

Figure 33:
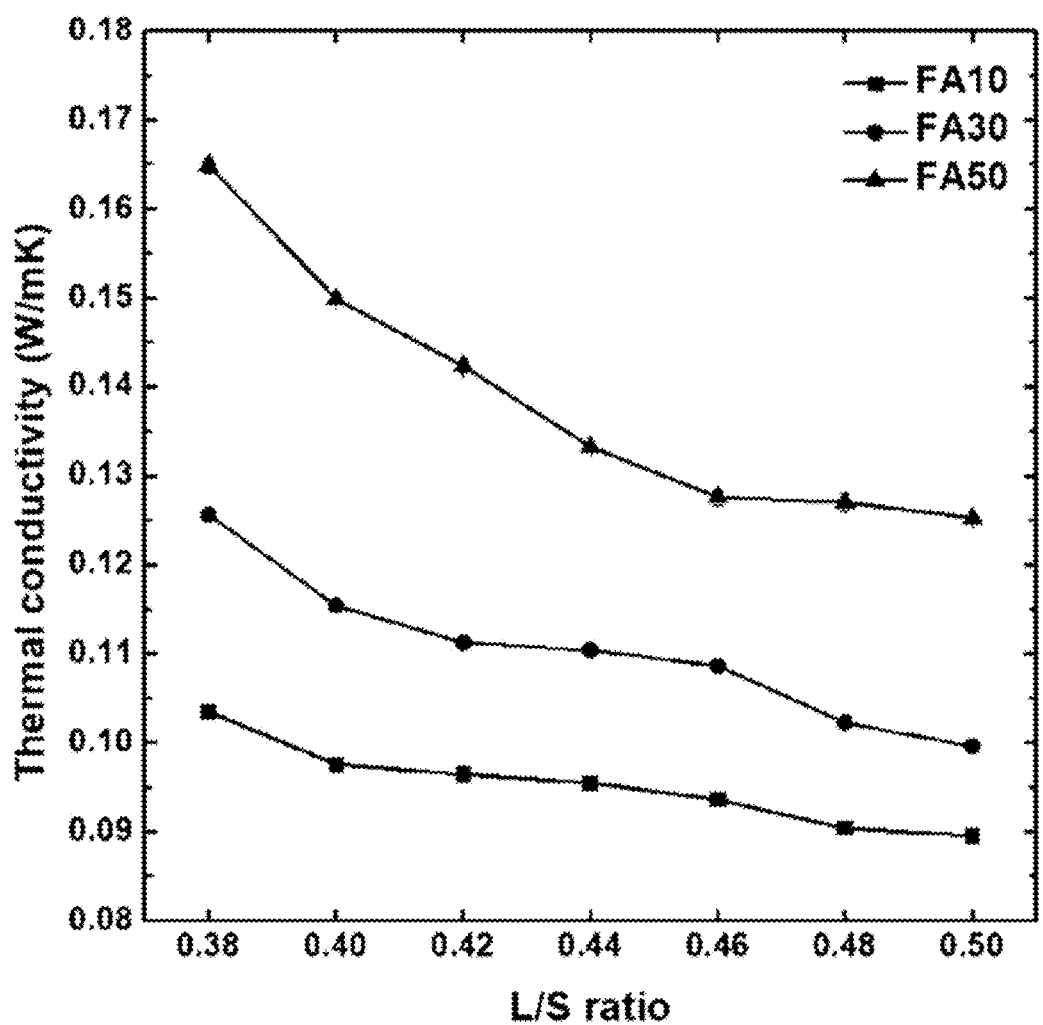
FIG. 33 shows thermal conductivity measurements of FA10, FA30, and FA50 against L/S ratio after exposure to a temperature of 400° C. according to the present disclosure.

Thermal conductivity measurements of FA10, FA30, and FA50 groups exposed to a temperature of 400° C. are depicted in FIG. 33. Each group exhibited a tendency to decrease in thermal conductivity as the L/S ratio increased. The minimum thermal conductivity achievable for each sample was 0.0895 W/mK for FA10, 0.0996 W/mK for FA30, and 0.125 W/mK for FA50. FA50 group has high thermal conductivity instead of thermal stability because expansion occurs small upon exposure to high temperatures. In contrast, FA10 group is low in thermal conductivity because it, although undergoing relatively poor geopolymerization, has a relatively large amount of residual water glass and expands greatly when exposed to high temperatures. These results imply that the thermal conductivity obtained during high-temperature exposure can be controlled by adjusting the amount of fly ash/bottom ash and the amount of alkyl activator to change the amount of moisture and residual water inside the foam structure.

4. Compressive Strength

Figure 34:
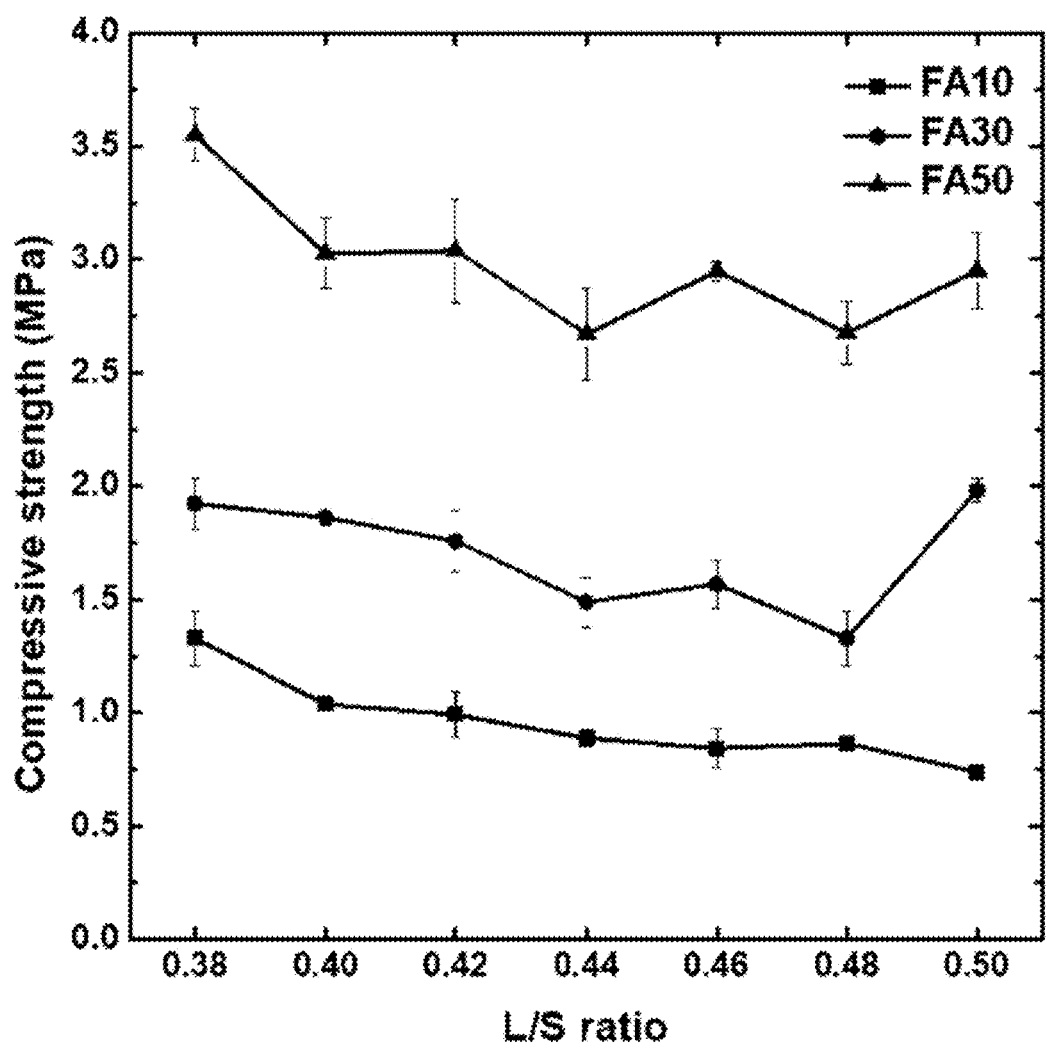
FIG. 34 shows compressive strength measurements of FA10, FA30, and FA50 against L/S ratio after exposure to a temperature of 400° C. according to the present disclosure.

Compressive strength measurements of FA10, FA30, and FA50 groups exposed to a temperature of 400° C. are depicted in FIG. 34. The sample groups not exposed to high temperatures has similar compressive strength regardless of the amount of fly ash, but after exposure to a temperature of 400° C., the compressive strength tends to decrease as the amount of fly ash decreases. Likewise, this is because a large level of expansion occurs due to the residual water glass.

5. SEM

Figure 35:
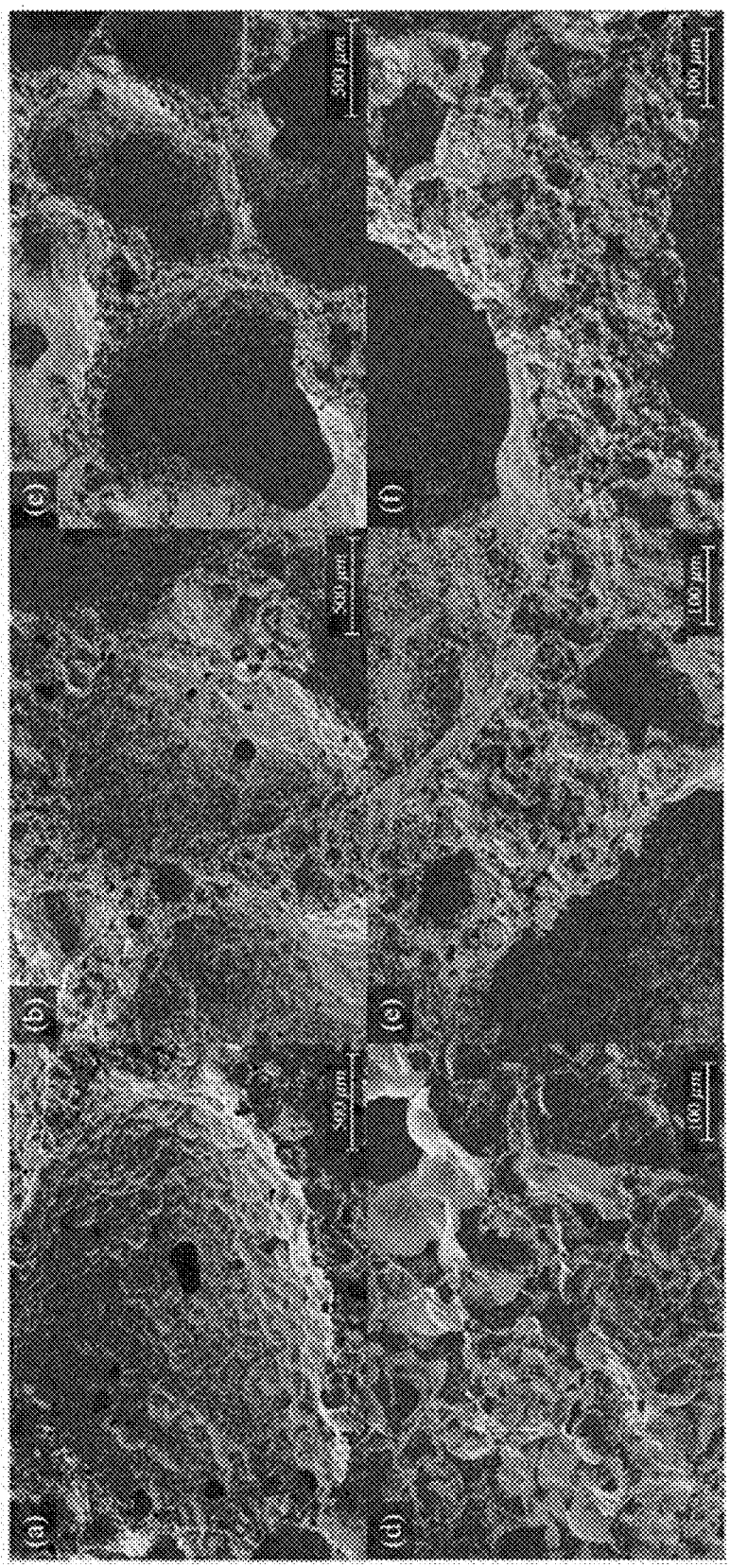
FIG. 35 shows SEM images of geopolymer foams of (a) 46FA10, (b) 46FA30, and (c) 46FA50, taken at 50× magnification, and of geopolymer foams of (d) 46FA10, (e) 46FA30, and (f) 46FA50, taken at 200× magnification according to the present disclosure.

FIG. 35 shows SEM images of 46FA10, 46FA30, and 46FA50 samples, taken at magnifications of 50 times (FIG. 35a-c) and 200 times (FIG. 35d-f). In 46FA10 sample (FIG. 35a), innumerable micropores are observed inside the pores and the pore wall is found to become thicker due to expansion. In the remaining 46FA30 and 46FA50 samples, the number of the microbubbles was reduced with the consequent observation of relatively smooth pore interiors and a small level of expansion generated a relatively thin pore wall. The structural difference among the sample groups resulted in the tendency for volume density and thermal conductivity previously confirmed.

CONCLUSION

In the present disclosure, a coal ash-based geopolymer foam added with silica fume as a foaming agent is synthesized. Along with the observation of the vertical cross-section of the foam, the foam formation mechanism according to the blending ratio of the raw materials was contemplated. Based on the mechanism, discussion was made of the bulk density, porosity, thermal conductivity, compressive strength, and SEM/EDS analysis results. However, in spite of having a low bulk density, the synthesized geopolymer foam exhibited high thermal conductivity due to residual moisture and water glass structures. Thus, exposure of the geopolymer foam to high temperatures was studied. First, reference samples were exposed to a temperature of 200, 300, 400, 500, and 600° C. and examined for resulting changes in bulk density, porosity, thermal conductivity, compressive strength, and microstructure. For detection of physicochemical changes occurring upon exposure to high temperatures, TG/DTG, DIL, ATR-FTIR, XRD, and SEM analyses were conducted, and the mechanisms thereof were identified. Based on the mechanisms, discussion was made of changes in physical properties at high temperatures. Effects of exposure temperature, L/S ratio, and fly ash content on the change in the physical properties of the geopolymer foam exposed to high temperatures was investigated, and the results are as follows.

(1) As the fly ash content decreases and the L/S ratio increases, a geopolymer foam having a porous structure with large pores is formed. Accordingly, the volume density and compressive strength tend to decrease with increasing of L/S ratio, but the thermal conductivity increases above a certain L/S ratio due to residual moisture and cured water glass. SEM/EDS analysis data exhibit that a considerable amount of a structure having residual water glass cured therein exists near the surface of the pore structure and a larger amount of residual cured water glass is present in the specimen with a lower fly ash content because of the low reactivity of bottom ash. Consequently, the specimen shows the physical properties including a bulk density of 0.608-0.837 g/cm$^3$, a thermal conductivity of 0.189-0.269 W/mK, and a compressive strength of 3.50-6.39 MPa.

(2) The geopolymer foam specimen expands while being exposed to a temperature of 200-400° C., with the maximal expansion at 400° C., but shrinks upon exposure to a temperature of 500-600° C. The geopolymer foam is expanded mainly by water vapor, which is a reaction product of the silanol group present in the residual cured water glass, and this expansion contributes, together with removal of residual moisture, to low thermal conductivity. However, as the cured water glass is softened and sintered at high temperature, the foam undergoes shrinkage with the consequent re-increase of the thermal conductivity.

(3) Specimens higher in L/S ratio and lower in fly ash content begin to expand at lower temperatures, with larger increments of expansion. This is ascribed to the existence of a large amount of residual cured water glass. As a result, the specimens decrease in bulk density, thermal conductivity, and compressive strength. In this study, 50FA10 specimen exposed to 400° C. exhibited the lowest bulk density 0.335 g/cm$^3$ and the lowest thermal conductivity 0.0895 W/mK, with a compressive strength of 0.739 MPa. However, the specimen begun to shrink at a relatively low temperature, with a tendency toward drastic shrinkage. Collectively, the geopolymer foam exposed to a temperature of as high as 400° C. showed a bulk density of 0.335-0.672 g/cm$^3$, a thermal conductivity of 0.0895-0.165 W/mK, and a compressive strength of 0.789-3.55 MPa.

In conclusion, the silicon fume-added, coal ash-based geopolymer foam forms a foam with hydrogen gas generated by the reaction of silicon and shows various physical properties depending on the ratio of bottom ash and fly ash and the amount of the alkali activator. The presence of residual moisture and cured water glass in the geopolymer foam that has undergone only oven curing causes the thermal conductivity to increase, but exposure to high temperatures removes residual moisture and induces the reaction of the cure water glass to significantly lower the thermal conductivity. Specifically, upon exposure to high temperatures, the geopolymer foam expanded by the silica fume may be further expanded by physically and chemically bound water, thereby achieving a thermal conductivity of as low as 0.0895 W/mK. These results show that geopolymer foams having various physical properties can be synthesized by adjusting the blending ratio of raw materials and the exposure temperatures. In addition, being free of any surfactant necessary for conventional foam synthesis methods using aluminum powder, the geopolymer foam is expected to be used as an inorganic insulation material that does not release any harmful substances even at high temperatures.

Taken together, the data in the present disclosure demonstrate that silica fume can be utilized to synthesis a coal ash-based geopolymer form having excellent physical properties. Furthermore, the structure and physical properties of the foam can be controlled by adjusting contents of the bottom ash, the fly ash, and the alkali activator and temperatures to which the foam is exposed. It is expected that bottom ash, which has not been widely used thus far, can be used in a large amount for manufacturing functional inorganic insulations and thus find a wide spectrum of applications.

While the present disclosure has been particularly described with reference to exemplary embodiments, the present disclosure is not limited thereto. It will be understood by those skilled in the art that various modifications and applications, which are not illustrated in the above, may be made without departing from the spirit and scope of the present disclosure. It should be interpreted that differences related to these modifications and applications are included in the scope of the present disclosure defined in the appended claims.

The invention claimed is:

1. A method for manufacturing geopolymer foam with coal ash, the method comprising the steps of:
   (1) mixing water glass ($Na_2SiO_3$) and sodium hydroxide (NaOH) to prepare an alkali activator;
   (2) adding silica fume as blowing agent to the alkali activator and stirring the same;
   (3) pulverizing coal bottom ash;
   (4) mixing the coal bottom ash with coal fly ash to prepare coal ash;
   (5) adding the mixture of silica fume and the alkali activator to the coal ash and then further adding the alkali activator to adjust a ratio of alkali activator/solid material comprising the coal ash and the silica fume, followed by mixing the same;
   (6) loading and sealing the mixture in a mold to prepare a specimen;
   (7) curing the specimen in an oven; and
   (8) exposing to a temperature of as high as 200° C. to 600° C. for 2 hours the specimen that has completely undergone the curing,
   wherein the coal fly ash is contained in an amount of 10 to 50% by weight based on the total weight of the coal bottom ash and the coal fly ash in step (4),
   wherein the ratio of alkali activator/the solid material comprising the coal ash and the silica fume ranges from 0.38 to 0.50 in step (5).

2. The method of claim 1, wherein the alkali activator contains the water glass ($Na_2SiO_3$) and the sodium hydroxide (NaOH) at a mass ratio of 5:1.

3. The method of claim 1, wherein the silica fume is contained in an amount of 15% by weight based on the total raw solid materials of the geopolymer foam.

4. The method of claim 1, wherein the step of pulverizing coal bottom ash is carried out by crushing once with a jaw crusher and then milling four times with a hammer mill, without a sieving process.

5. A geopolymer foam utilizing coal ash, manufactured according to the method of claim 1.

* * * * *